US010247969B1

(12) United States Patent
Bonneau et al.

(10) Patent No.: US 10,247,969 B1
(45) Date of Patent: Apr. 2, 2019

(54) PHOTON SOURCES WITH MULTIPLE CAVITIES FOR GENERATION OF INDIVIDUAL PHOTONS

(71) Applicant: PsiQuantum Corp., Palo Alto, CA (US)

(72) Inventors: Damien Bonneau, Bristol (GB); Mark Thompson, Palo Alto, CA (US); Syrus Ziai, Palo Alto, CA (US)

(73) Assignee: PsiQuantum Corp., Palo Alto, CA (US)

( * ) Notice: Subject to any disclaimer, the term of this patent is extended or adjusted under 35 U.S.C. 154(b) by 0 days.

(21) Appl. No.: 16/015,097

(22) Filed: Jun. 21, 2018

(51) Int. Cl.
| G02B 6/125 | (2006.01) |
| G02F 1/017 | (2006.01) |
| G02B 6/42  | (2006.01) |
| G02B 6/122 | (2006.01) |
| B82Y 20/00 | (2011.01) |

(52) U.S. Cl.
CPC ....... *G02F 1/01708* (2013.01); *G02B 6/1225* (2013.01); *G02B 6/4214* (2013.01); *B82Y 20/00* (2013.01)

(58) Field of Classification Search
None
See application file for complete search history.

(56) References Cited

U.S. PATENT DOCUMENTS

| 4,306,765 | A | * | 12/1981 | Winzer | G02B 6/2817 |
|           |   |   |         |        | 359/900 |
| 4,839,898 | A | * | 6/1989  | Payne  | H01S 3/067 |
|           |   |   |         |        | 372/6 |
| 4,989,937 | A | * | 2/1991  | Mahlein | G02B 6/12007 |
|           |   |   |         |        | 385/24 |
| 5,764,825 | A | * | 6/1998  | Mugino | G02B 6/12007 |
|           |   |   |         |        | 385/14 |
| 6,377,718 | B1 | * | 4/2002 | Que    | G02B 6/3524 |
|           |   |   |         |        | 385/3 |
| 6,445,845 | B1 | * | 9/2002 | Sakata | G02B 6/35 |
|           |   |   |         |        | 385/16 |

(Continued)

OTHER PUBLICATIONS

Guo et al., "Parametric down-conversion photon pair source on a nanophotonic chip," Mar. 11, 2016, 9 pgs.

*Primary Examiner* — William R Alexander
*Assistant Examiner* — Balram T Parbadia
(74) *Attorney, Agent, or Firm* — Morgan, Lewis & Bockius LLP

(57) ABSTRACT

A photon source device includes a substrate and a first waveguide arranged on the substrate. The first waveguide is coupled with a first pair of reflectors defining a first resonant cavity in the first waveguide. The first resonant cavity is configured for outputting a first output wavelength and a second output wavelength. The first pair of reflectors include a partial reflector for the first output wavelength and a partial reflector for the second output wavelength. The photon source device further includes a second pair of reflectors defining a second resonant cavity that intersects with the first resonant cavity. The second resonant cavity is configured for receiving an input wavelength distinct from the first and the second output wavelengths. A first reflector and a second reflector of the second pair of reflectors have a first reflectance and a second reflectance for the input wavelength, respectively.

16 Claims, 18 Drawing Sheets

(56) References Cited

U.S. PATENT DOCUMENTS

| | | | | |
|---|---|---|---|---|
| 6,768,830 | B1* | 7/2004 | Lacey | G02B 6/3538 |
| | | | | 385/15 |
| 9,116,293 | B2* | 8/2015 | Van Orden | G02B 6/26 |
| 2002/0094157 | A1* | 7/2002 | Xie | G02B 6/29358 |
| | | | | 385/27 |
| 2003/0091266 | A1* | 5/2003 | Troll | G02B 6/3538 |
| | | | | 385/16 |
| 2006/0008203 | A1* | 1/2006 | Maeda | B82Y 20/00 |
| | | | | 385/27 |
| 2007/0230868 | A1* | 10/2007 | Miyadera | G02B 6/2813 |
| | | | | 385/24 |
| 2008/0253713 | A1* | 10/2008 | Piede | G02B 6/12004 |
| | | | | 385/14 |
| 2009/0180731 | A1* | 7/2009 | Christensen | G02B 6/125 |
| | | | | 385/13 |

\* cited by examiner

US 10,247,969 B1

PHOTON SOURCES WITH MULTIPLE CAVITIES FOR GENERATION OF INDIVIDUAL PHOTONS

TECHNICAL FIELD

This relates generally to photonic devices (or hybrid electronic/photonic devices) and, more specifically, to photonic devices (or hybrid electronic/photonic devices) that generate separated photons or photon pairs.

BACKGROUND

Single-photon sources are light sources that can emit light as single particles (photons) at respective times. These sources are useful in a wide variety of applications. However, single-photon sources do not behave deterministically. That is, for each attempt to emit a single-photon, the probability of success is less than 100%, and, as a result, sometimes no photon is emitted at all for a particular attempt. In some circumstances, an attempt to produce a single-photon may produce two photons, which may also be considered an unsuccessful attempt when no more than one photon is required.

Conventional single-photon sources have limited yields in generating single photons. Accordingly, there is a need for methods and devices that improve the efficiency and reliability of single-photon sources.

SUMMARY

Efficient and reliable photon sources are important for applications in quantum computing where there is a need to produce well-defined states of photons. The above deficiencies and other related problems are reduced or eliminated by photon source devices and methods described herein. The photon source devices and methods described herein produce an output that, effectively, has characteristics of a single-photon source with a higher efficiency and reliability (e.g., single-photon generation success rate) than conventional single-photon sources and methods. For example, the photon source devices and methods described herein use a reduced pump energy per pulse in achieving a given probability of photon pair emission (e.g., 10%). In addition, the photon source devices and methods described herein provide photon pairs of high spectral separability. Furthermore, the photon source devices and methods described herein reduce photon losses.

Spontaneous four-wave mixing is a phenomenon that may be used for generating photon pairs (e.g., a signal photon and an idler photon) from an input beam (e.g., coherent light, such as a laser beam). Due to the requirements for energy conservation and momentum conservation, the photon pairs are typically collinear with, and propagate in the same direction as, the input beam. To lower the power requirement, and to increase the spectral separability of the two photons, a cavity is often built around the non-linear region of interaction. Many co-propagating schemes exist, and counter-propagating pumps generating counter propagating pairs have been proposed. This requires a single resonant cavity that is compatible with not only the input beam but also signal and idler photons. In addition, as the input beam propagates with the signal and idler photons, separating the photon pairs from the input beam reduces the yield of these photon pairs, which, in turn, reduces the efficiency and reliability of such conventional single-photon sources.

One or more embodiments of the present disclosure provides methods and photon source devices for generating individual photons (e.g., a pair of single photons, such as a pair of a signal photon and an idler photon). To that end, a photon source device includes a substrate and a first waveguide arranged on the substrate. The first waveguide extends along a first axis, and is coupled with a first pair of reflectors defining a first resonant cavity in the first waveguide. The first resonant cavity is configured for outputting a first output wavelength and a second output wavelength. The first pair of reflectors include a partial reflector for the first output wavelength and a partial reflector for the second output wavelength. The photon source device further includes a second pair of reflectors defining a second resonant cavity. The second resonant cavity extends along a second axis that is non-parallel to the first axis. The second resonant cavity intersects with the first resonant cavity. The second resonant cavity is configured for receiving an input wavelength that is distinct from the first output wavelength and the second output wavelength. A first reflector of the second pair of reflectors has a first reflectance for the input wavelength, and a second reflector of the second pair of reflectors has a second reflectance for the input wavelength.

In some embodiments, the photon source device further includes a second waveguide arranged on the substrate. The second waveguide is coupled with the second pair of reflectors so that the second resonant cavity is defined within the second waveguide. The second reflectance is greater than the first reflectance for the input wavelength, and the second waveguide is configured to receive input light of the input wavelength through the first reflector.

In some embodiments, the photon source device further includes a third waveguide arranged on the substrate. The third waveguide extends along a third axis, and is coupled with a third pair of reflectors defining a third resonant cavity in the third waveguide for a third output wavelength that is distinct from the input wavelength and a fourth output wavelength that is distinct from the input wavelength. The third pair of reflectors includes a partial reflector for the third output wavelength and a partial reflector for the fourth output wavelength. The second resonant cavity intersects with the third resonant cavity. Further, in some embodiments, the second resonant cavity intersects with both the third resonant cavity and the first resonant cavity at a first interaction region of the second resonant cavity. Alternatively, in some embodiments, the first resonant cavity intersects with the second resonant cavity at a first interaction region of the second resonant cavity, and the second resonant cavity intersects with the second resonant cavity at a second interaction region of the second resonant cavity that is distinct and separate from the first interaction region of the second resonant cavity.

In some embodiments, the input wavelength includes a first input wavelength. The photon source device further includes a fourth waveguide arranged on the substrate. The fourth waveguide extends along a fourth axis, and is coupled with a fourth pair of reflectors defining a fourth resonant cavity in the fourth waveguide for a second input wavelength. A first reflector of the fourth pair of reflectors is a partial reflector for the second input wavelength. A second reflector of the fourth pair of reflectors has a reflectance for the second input wavelength that is greater than a reflectance of the first reflector of the fourth pair of reflectors for the second input wavelength. The first resonant cavity intersects with the fourth resonant cavity. Further, in some embodiments, the first resonant cavity intersects with both the second resonant cavity and the fourth resonant cavity at a first interaction region of the first resonant cavity. Alternatively, in some embodiments, the first resonant cavity intersects with the second resonant cavity at a first interaction region of the first resonant cavity, and the fourth resonant cavity intersects with the first resonant cavity at a third interaction region of the first resonant cavity that is distinct and separate from the first interaction region of the first resonant cavity.

Further, the present disclosure provides a method of providing photons. The method includes receiving input light of an input wavelength and causing the input light of the input wavelength to resonate within a second resonant cavity defined by a second pair of reflectors. The method further includes outputting a first photon of a first output wavelength and a second photon of a second output wavelength from a first waveguide. The second resonant cavity intersects with a first resonant cavity defined by a first pair of reflectors coupled with the first waveguide. The first waveguide extends along a first axis. The second resonant cavity extends along a second axis that is non-parallel to the first axis. The input wavelength is distinct from the first output wavelength and the second output wavelength. The first resonant cavity is configured for a first output wavelength and a second output wavelength. The first pair of reflectors includes a partial reflector for the first output wavelength and a partial reflector for the second output wavelength.

BRIEF DESCRIPTION OF THE DRAWINGS

For a better understanding of the various described embodiments, reference should be made to the Detailed Description below, in conjunction with the following drawings in which like reference numerals refer to corresponding parts throughout the figures.

Like reference numerals refer to corresponding parts throughout the several views of the drawings.

DETAILED DESCRIPTION

Figure 1A:
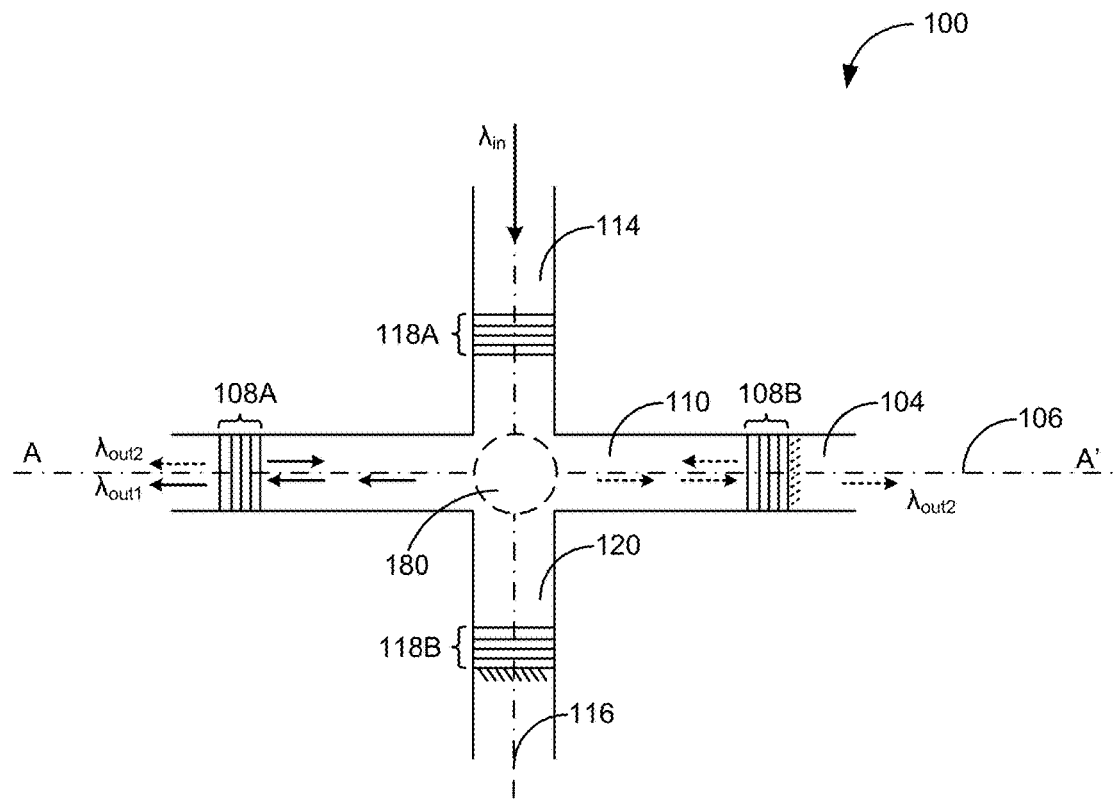
FIG. 1A is a top view of an example photon source device in accordance with some embodiments.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

In accordance with some embodiments, an input beam (also called herein a pump beam, which can be a pulsed beam, such as a pulsed beam having a pulse width of 2 ps or less) is coupled (e.g., provided) into a pump cavity that contains a non-linear optical medium (e.g., a $\chi 3$ material). As a result of interactions between one or more photons of the pulsed pump beam and the non-linear optical medium, one or more photons of the pulsed pump beam can be converted to one or more photon pairs, each photon pair including two output photons. This conversion process satisfies energy conservation and approximate momentum conservation requirements. Specifically, two input pump photons having a total energy of 2Ep and zero total momentum (e.g., two counter-propagating photons) are converted in the pump cavity to two output photons, namely a signal photon having an energy of Es and a momentum of Ks and an idler photon having an energy of Ei and a momentum of Ki. The satisfaction of energy conservation leads to a relationship Ei+Es=2Ep. Likewise, the approximate momentum conservation leads to the relationship Ki−Ks<1/L, where L is the length of a photon pair cavity that outputs the photon pair. Thus, a photon pair cavity is used in addition to the pump cavity for guiding and outputting the two photons.

The photon pair cavity intersects with the pump cavity. The photon pair (e.g., the signal and idler photons) can resonate within the photon pair cavity after they are generated in the pump cavity and enter the photon pair cavity. The photon pair cavity includes a first reflector that defines a first end of the photon pair cavity and outputs the signal photon. The photon pair cavity also includes a second reflector that defines a second end of the photon pair cavity located opposite to the first end of the photon pair cavity. In some embodiments, either one of the first and second reflectors includes a distributed Bragg reflector. In some embodiments, the first reflector includes a distributed Bragg reflector and the second reflector includes a distributed Bragg reflector. In some embodiments, the first reflector is partially transparent to both the signal and idler photons, and the second reflector is fully reflective for the signal and idler photons. In such embodiments, both the signal and idler photons of the photon pair are outputted via the first end of the photon pair cavity. Alternatively, in some embodiments, the first reflector is fully reflective for the idler photon and partially transparent to the signal photon, while the second reflector is partially transparent to the idler photon and fully reflective for the signal photon. By these means, the signal and idler photons of the photon pair are separated and the signal photon is outputted from the first end of the photon pair cavity and the idler photon is outputted from the second end of the photon pair cavity.

Figure 1B:
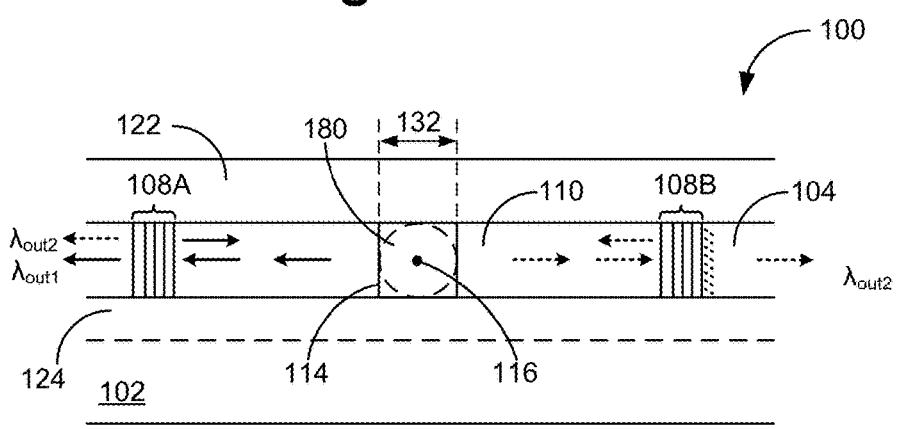
FIG. 1B is a cross-sectional view of the photon source device shown in FIG. 1A in accordance with some embodiments.

FIG. 1A is a top view of example photon source device 100 in accordance with some embodiments. FIG. 1B is a cross-sectional view of photon source device 100 shown in FIG. 1A in accordance with some embodiments. Line AA' in FIG. 1A represents a view from which the cross-section shown in FIG. 1B is taken.

Photon source device 100 includes substrate 102 and first waveguide 104 and second waveguide 114 arranged on substrate 102.

First waveguide 104 extends along first axis 106 (e.g., parallel to line AA'), and is coupled with a first pair of reflectors 108 (e.g., 108A and 108B) defining first resonant cavity 110 in first waveguide 104. First resonant cavity 110 is configured for a first output wavelength $\lambda_{out1}$ and a second output wavelength $\lambda_{out2}$ (e.g., the cavity length of first resonant cavity 110 is an integer multiple of ($\lambda_{out1}$/2n) and also an integer multiple of ($\lambda_{out2}$/2n), where n is a refractive index of material between the first pair of reflectors 108). The first pair of reflectors 108 includes a partial reflector for the first output wavelength $\lambda_{out1}$ and a partial reflector for the second output wavelength $\lambda_{out2}$.

Second waveguide 114 includes a second pair of reflectors 118 (e.g., 118A and 118B) defining second resonant cavity 120 extending along second axis 116 that is non-parallel to first axis 106 (e.g., in some cases, second axis 116 is perpendicular to first axis 106). Second resonant cavity 120 intersects with first resonant cavity 110, and is configured for an input wavelength $\lambda_{in}$ that is distinct from the first output wavelength $\lambda_{out1}$ and the second output wavelength $\lambda_{out2}$ (e.g., the cavity length of second resonant cavity 120 is an integer multiple of ($\lambda_{in}$/2n), where n is a refractive index of material between the second pair of reflectors 118). First reflector 118A of the second pair of reflectors 118 has a first reflectance for the input wavelength $\lambda_{in}$, and second reflector 118B of the second pair of reflectors 118 has a second reflectance for the input wavelength $\lambda_{in}$. In some embodiments, the second reflectance is distinct from the first reflectance (e.g., the second reflectance is greater than the first reflectance).

First waveguide 104 intersects with the second waveguide 114 at interaction region 180. As shown in FIG. 1A, first axis 106 and second axis 116 also intersect with each other and define a common plane. In some embodiments, the common plane is substantially parallel to a planar surface of substrate 102. In FIG. 1A, an input light of the input wavelength $\lambda_{in}$ enters second resonant cavity 120 along a direction that is substantially parallel to the planar surface of substrate 102. In some embodiments, the direction is substantially parallel to second axis 116. Referring to FIG. 1A, for example, the first and second axes 106 and 116 intersect each other at an angle that is substantially equal to 90 degrees. It is noted that in some implementations, the first and second axes 106 and 116 may also intersect each other at an angle that is not equal to 90 degrees (e.g., at least 85 degrees, at least 80 degrees, at least 75 degrees, at least 70 degrees, at least 65 degrees, at least 60 degrees, at least 55 degrees, at least 50 degrees, at least 45 degrees, etc.).

Second waveguide 114 is configured to receive the input light of the input wavelength $\lambda_{in}$ from an input end. In some cases, the input end is coupled to a laser light source directly or indirectly, and the laser light source is configured to provide the input light of the input wavelength $\lambda_{in}$. The input light of the input wavelength $\lambda_{in}$ passes through first reflector 118A of the second pair of reflectors 118 and enters second resonant cavity 120. Two ends of second resonant cavity 120 are defined by first reflector 118A and second reflector 118B, respectively, which cause the input light of the input wavelength $\lambda_{in}$ to reflect therebetween. In some embodiments, second resonant cavity 120 has a length that is configured to cause resonance of the input light of the input wavelength $\lambda_{in}$ in second resonant cavity 120 (e.g., the length of second resonant cavity 120 is an integer multiple of $\lambda_{in}$/2n, where n is a refractive index of material between first reflector 118A and second reflector 118B).

In FIG. 1A, the second reflectance of second reflector 118B is greater than the first reflectance of first reflector 118A for the input wavelength $\lambda_{in}$. In some embodiments, second reflector 118B reflects a substantial portion of the input light of input wavelength $\lambda_{in}$, and the substantial portion is larger than a threshold percentage (e.g., at least 90%, at least 91%, at least 92%, at least 93%, at least 94%, at least 95%, at least 96%, at least 97%, at least 98%, at least 99%, etc.) of the input light. To reflect the substantial portion of the input light, the second reflectance of the input wavelength $\lambda_{in}$ of second reflector 118B of the second pair of reflectors 118 is greater than a predetermined reflectance threshold (e.g., 91%, 92%, 93%, 94%, 95%, 96%, 97%, 98%, 99%, etc.).

In some embodiments, first reflector 118A and second reflector 118B have a same reflectance.

Interaction region 180 of first resonant cavity 110 and second resonant cavity 120 is located on a traveling path of the input light of the input wavelength $\lambda_{in}$, when the input light travels in second resonant cavity 120. At least a portion of interaction region 180 is filled with a non-linear optical medium that causes conversion of the input light of the input wavelength $\lambda_{in}$. For example, the input light of the input wavelength $\lambda_{in}$ interacts with the non-linear optical medium in interaction region 180 and generates photons having wavelengths that are distinct from the input wavelength $\lambda_{in}$. In an example, the non-linear optical medium in interaction region 180 has a third order non-linear polarization coefficient ($\chi^{(3)}$) that is not equal to zero. In some embodiments, interaction region 180 is completely filled with the non-linear optical medium. In some embodiments, first waveguide 104 and second waveguide 114 are filled with the non-linear optical medium. In some implementations, the input wavelength $\lambda_{in}$ is provided by one or more Nd:YAG lasers, and corresponds to 1064 nm. In some other implementations, the input wavelength $\lambda_{in}$ is provided by one or more Ti:sapphire lasers, and corresponds to 1800 nm. In some other implementations, the input wavelength is provided by an erbium doped laser emitting in one of the telecommunication bands. Examples of the non-linear optical medium include, but are not limited to, silicon and silicon nitride, chalcogenide glass, graphene, organic compounds, such as DDMEBT (2-[4-dimethylamino)phenyl]-3-{[4-(dimethylamino)phenyl]ethynyl}buta-1,3-diene-1,1,4,4-tetracarbonitrile).

In some implementations, the input light of the input wavelength $\lambda_{in}$ is converted into a pair of photons in the interaction region 180. The pair of photons includes a first photon having a wavelength that matches the first output wavelength $\lambda_{out1}$ and a second photon having a wavelength that matches the second output wavelength $\lambda_{out2}$. Thereafter, the photons of the first output wavelength $\lambda_{out1}$ and the second output wavelength $\lambda_{out2}$ travel within first resonant cavity 110, and are outputted from first waveguide 104 via at least one reflector of the first pair of reflectors 108. Optionally, one of the first and second output wavelengths $\lambda_{out1}$ and $\lambda_{out2}$ is shorter than the input wavelength $\lambda_{in}$ and the other of the first and second output wavelengths $\lambda_{out1}$ and $\lambda_{out2}$ is longer than the input wavelength $\lambda_{in}$ (in spontaneous four wave mixing using a material having a third order non-linear polarization coefficient ($\chi^{(3)}$) that is not equal to zero).

Specifically, two ends of first resonant cavity 110 are defined by first reflector 108A and second reflector 108B, respectively, and make the photons travel therebetween. In some embodiments, first resonant cavity 110 has a length (e.g., an integer multiple of $\lambda_{out1}/2n$ and/or an integer multiple of $\lambda_{out2}/2n$) that is configured to cause resonance of the photons of the first output wavelength $\lambda_{out1}$ and/or the photons of the second output wavelength $\lambda_{out2}$ within first resonant cavity 110. In some embodiments, the length of first resonant cavity 110 causes resonance of both the photons of the first output wavelength $\lambda_{out1}$ and the photons of the second output wavelength $\lambda_{out2}$. In some cases, the first output wavelength $\lambda_{out1}$ and the second output wavelength $\lambda_{out2}$ are associated (e.g., they are harmonics of each other).

In some embodiments, first waveguide 104 is configured to output the photons of the first output wavelength $\lambda_{out1}$ and the photons of the second output wavelength $\lambda_{out2}$ through first reflector 108A of the first pair of reflectors 108. In such cases, first reflector 108A of the first pair of reflectors 108 serves as both the partial reflector for the first output wavelength $\lambda_{out1}$ (e.g., having a reflectivity of 98% or less for the first output wavelength $\lambda_{out1}$) and the partial reflector for the second output wavelength $\lambda_{out2}$ (e.g., having a reflectivity of 98% or less for the second output wavelength $\lambda_{out2}$). In addition to first reflector 108A, the first pair of reflectors 108 further includes a second reflector 108B located opposite to first reflector 108A of the first pair of reflectors 108. Optionally, when first reflector 108A is used to output both the photons of the output wavelength $\lambda_{out1}$ and the photons of the output wavelength $\lambda_{out2}$, first reflector 108A has a reflectance less than a reflectance of second reflector 108B for the output wavelengths $\lambda_{out1}$ and $\lambda_{out2}$. Further, in some embodiments, second reflector 108B of the first pair of reflectors 108 has a reflectance for the first output wavelength $\lambda_{out1}$ that is greater than a predetermined reflectance threshold and a reflectance for the second output wavelength $\lambda_{out2}$ that is greater than the predetermined reflectance threshold, such that second reflector 108B reflects a substantial portion (e.g., >98%, such as 99.9%) of the photons of the first and second output wavelengths $\lambda_{out1}$ and $\lambda_{out2}$.

Alternatively, in some embodiments, first waveguide 104 is configured to output the photons of the first output wavelength $\lambda_{out1}$ and the photons of the second output wavelength $\lambda_{out2}$ separately through first reflector 108A and second reflector 108B of the first pair of reflectors 108. For example, a substantial portion of the photons of the first output wavelength $\lambda_{out1}$ is outputted via first reflector 108A, which serves as the partial reflector for the first output wavelength $\lambda_{out1}$ (e.g., first reflector 108A has a reflectivity of 98% or less, such as 95%, 90%, 80%, 70%, 60%, 50%, 40%, 30%, 20%, 10%, or 5% for the first output wavelength $\lambda_{out1}$). A substantial portion of the photons of the second output wavelength $\lambda_{out2}$ is outputted via second reflector 108B, which serves as the partial reflector for the second output wavelength $\lambda_{out2}$ (e.g., second reflector 108B has a reflectivity of 98% or less, such as 95%, 90%, 80%, 70%, 60%, 50%, 40%, 30%, 20%, 10%, or 5% for the second output wavelength $\lambda_{out2}$). In some situations, the substantial portion is larger than a threshold percentage (e.g., 98% or less, such as 95%) of the photons of the respective output wavelength. In some embodiments, first reflector 108A serves as a full reflector for the second output wavelength $\lambda_{out2}$ (e.g., first reflector 108A has a reflectivity of 95% or more, such as 95%, 98%, 99%, or 99.9% for the second output wavelength $\lambda_{out2}$) and second reflector 108B serves as a full reflector for the first output wavelength $\lambda_{out1}$ (e.g., second reflector 108B has a reflectivity of 95% or more, such as 95%, 98%, 99%, or 99.9% for the first output wavelength $\lambda_{out1}$).

In some embodiments, the reflectance of first reflector 108A for the first output wavelength $\lambda_{out1}$ is at least 95%, at least 96%, at least 97%, at least 98%, at least 99%, at least 99.9%, or at least 99.99%. In some embodiments, the reflectance of first reflector 108A for the second output wavelength $\lambda_{out2}$ is at least 95%, at least 96%, at least 97%, at least 98%, at least 99%, at least 99.9%, or at least 99.99%. In some embodiments, the reflectance of second reflector 108B for the first output wavelength $\lambda_{out1}$ is at least 95%, at least 96%, at least 97%, at least 98%, at least 99%, at least 99.9%, or at least 99.99%. In some embodiments, the reflectance of second reflector 108B for the second output wavelength $\lambda_{out2}$ is at least 95%, at least 96%, at least 97%, at least 98%, at least 99%, at least 99.9%, or at least 99.99%.

In some embodiments, the reflectance of first reflector 108A is greater than the reflectance of first reflector 118A and the reflectance of second reflector 118B for the first output wavelength $\lambda_{out1}$. In some embodiments, the reflectance of second reflector 108B is greater than the reflectance of first reflector 118A and the reflectance of second reflector 118B for the first output wavelength $\lambda_{out1}$. In some embodiments, the reflectance of first reflector 108A is greater than the reflectance of first reflector 118A and the reflectance of second reflector 118B for the second output wavelength $\lambda_{out2}$. In some embodiments, the reflectance of second reflector 108B is greater than the reflectance of first reflector 118A and the reflectance of second reflector 118B for the second output wavelength $\lambda_{out2}$.

In some embodiments, first reflector 108A and second reflector 108B of the first pair of reflectors 108 are positioned to define first resonant cavity 110 (e.g., first reflector 108A and second reflector 108B of the first pair of reflectors 108 are positioned or aligned parallel to each other) in first waveguide 104. In some embodiments, first reflector 108A and second reflector 108B of the first pair of reflectors 108 are perpendicular to first axis 106 along which first waveguide 104 extends. First reflector 118A and second reflector 118B of the second pair of reflectors 118 are positioned to define second resonant cavity 120 (e.g., first reflector 118A and second reflector 118B of the second pair of reflectors 118 are positioned or aligned parallel to each other). In some embodiments, first reflector 118A and second reflector 118B of the second pair of reflectors 118 are perpendicular to second axis 116 along which second resonant cavity 120 extends. In some embodiments, at least one reflector of the first pair of reflectors 108 and the second pair of reflectors 118 includes a distributed Bragg reflector. In some embodiments, each reflector of the first pair of reflectors 108 and the second pair of reflectors 118 includes a distributed Bragg reflector. Optionally, the distributed Bragg reflector includes a plurality of layers of alternating materials with varying refractive index. Optionally, the distributed Bragg reflector includes a periodic variation of a characteristic (e.g., a thickness) of the plurality of layers.

In addition to the reflectivity of reflectors, a cavity length of the optical cavity determines how light resonates within the optical cavity. For example, a cavity length L typically follows a following relationship: $L = m \cdot (\lambda/2) \cdot (1/n)$, where m is an integer number, $\lambda$ is a wavelength of light in vacuum, and n is a refractive index of a material filling the space between the pair of reflectors.

In some embodiments, the effective pump cavity length (e.g., a mathematical product of a cavity length of second resonant cavity 120, such as a distance between first reflector 118A and second reflector 118B, and an effective refractive index of a material located between first reflector 118A and second reflector 118B) is at least 5 µm. In some embodiments, the effective pump cavity length is at least 6 µm. In some embodiments, the effective pump cavity length is at least 7 µm. In some embodiments, the effective pump cavity length is at least 8 µm. In some embodiments, the effective pump cavity length is at least 9 µm. In some embodiments, the effective pump cavity length is at least 10 µm. In some embodiments, the effective pump cavity length is at least 15 µm. In some embodiments, the effective pump cavity length is at least 20 µm. In some embodiments, the effective pump cavity length is at least 25 µm. In some embodiments, the effective pump cavity length is at least 30 µm.

In some embodiments, the effective pump cavity length is at most 5 µm. In some embodiments, the effective pump cavity length is at most 6 µm. In some embodiments, the effective pump cavity length is at most 7 µm. In some embodiments, the effective pump cavity length is at most 8 µm. In some embodiments, the effective pump cavity length is at most 9 µm. In some embodiments, the effective pump cavity length is at most 10 µm. In some embodiments, the effective pump cavity length is at most 15 µm. In some embodiments, the effective pump cavity length is at most 20 µm. In some embodiments, the effective pump cavity length is at most 25 µm. In some embodiments, the effective pump cavity length is at most 30 µm.

In some embodiments, the effective pump cavity length is between 5 µm and 10 µm. In some embodiments, the effective pump cavity length is between 5 µm and 15 µm. In some embodiments, the effective pump cavity length is between 5 µm and 20 µm. In some embodiments, the effective pump cavity length is between 5 µm and 25 µm. In some embodiments, the effective pump cavity length is between 5 µm and 30 µm. In some embodiments, the effective pump cavity length is between 10 µm and 15 µm. In some embodiments, the effective pump cavity length is between 10 µm and 20 µm. In some embodiments, the effective pump cavity length is between 10 µm and 25 µm. In some embodiments, the effective pump cavity length is between 10 µm and 30 µm. In some embodiments, the effective pump cavity length is between 15 µm and 20 µm. In some embodiments, the effective pump cavity length is between 15 µm and 25 µm. In some embodiments, the effective pump cavity length is between 15 µm and 30 µm. In some embodiments, the effective pump cavity length is between 20 µm and 25 µm. In some embodiments, the effective pump cavity length is between 20 µm and 30 µm.

In some embodiments, the effective pair cavity length (e.g., a mathematical product of a cavity length of first resonant cavity 110, such as a distance between first reflector 108A and second reflector 108B, and an effective refractive index of a material located between first reflector 108A and second reflector 108B) is at least 50 µm. In some embodiments, the effective pair cavity length is at least 60 µm. In some embodiments, the effective pair cavity length is at least 70 µm. In some embodiments, the effective pair cavity length is at least 80 µm. In some embodiments, the effective pair cavity length is at least 90 µm. In some embodiments, the effective pair cavity length is at least 100 µm. In some embodiments, the effective pair cavity length is at least 150 µm. In some embodiments, the effective pair cavity length is at least 200 µm. In some embodiments, the effective pair cavity length is at least 250 µm. In some embodiments, the effective pair cavity length is at least 300 µm.

In some embodiments, the effective pair cavity length is at most 50 µm. In some embodiments, the effective pair cavity length is at most 60 µm. In some embodiments, the effective pair cavity length is at most 70 µm. In some embodiments, the effective pair cavity length is at most 80 µm. In some embodiments, the effective pair cavity length is at most 90 µm. In some embodiments, the effective pair cavity length is at most 100 µm. In some embodiments, the effective pair cavity length is at most 150 µm. In some embodiments, the effective pair cavity length is at most 200 µm. In some embodiments, the effective pair cavity length is at most 250 µm. In some embodiments, the effective pair cavity length is at most 300 µm.

In some embodiments, the effective pair cavity length is between 50 µm and 100 µm. In some embodiments, the effective pair cavity length is between 50 µm and 150 µm. In some embodiments, the effective pair cavity length is between 50 µm and 200 µm. In some embodiments, the effective pair cavity length is between 50 µm and 250 µm. In some embodiments, the effective pair cavity length is between 50 µm and 300 µm. In some embodiments, the effective pair cavity length is between 100 µm and 150 µm. In some embodiments, the effective pair cavity length is between 100 µm and 200 µm. In some embodiments, the effective pair cavity length is between 100 µm and 250 µm. In some embodiments, the effective pair cavity length is between 100 µm and 300 µm. In some embodiments, the effective pair cavity length is between 150 µm and 200 µm. In some embodiments, the effective pair cavity length is between 150 μm and 250 μm. In some embodiments, the effective pair cavity length is between 150 μm and 300 μm. In some embodiments, the effective pair cavity length is between 200 μm and 250 μm. In some embodiments, the effective pair cavity length is between 200 μm and 300 μm.

In some embodiments, the effective pair cavity length is at least 2 times the effective pump cavity length. In some embodiments, the effective pair cavity length is at least 3 times the effective pump cavity length. In some embodiments, the effective pair cavity length is at least 4 times the effective pump cavity length. In some embodiments, the effective pair cavity length is at least 5 times the effective pump cavity length. In some embodiments, the effective pair cavity length is at least 6 times the effective pump cavity length. In some embodiments, the effective pair cavity length is at least 7 times the effective pump cavity length. In some embodiments, the effective pair cavity length is at least 8 times the effective pump cavity length. In some embodiments, the effective pair cavity length is at least 9 times the effective pump cavity length. In some embodiments, the effective pair cavity length is at least 10 times the effective pump cavity length. In some embodiments, the effective pair cavity length is at least 11 times the effective pump cavity length. In some embodiments, the effective pair cavity length is at least 12 times the effective pump cavity length. In some embodiments, the effective pair cavity length is at least 13 times the effective pump cavity length. In some embodiments, the effective pair cavity length is at least 14 times the effective pump cavity length. In some embodiments, the effective pair cavity length is at least 15 times the effective pump cavity length. In some embodiments, the effective pair cavity length is at least 16 times the effective pump cavity length. In some embodiments, the effective pair cavity length is at least 17 times the effective pump cavity length. In some embodiments, the effective pair cavity length is at least 18 times the effective pump cavity length. In some embodiments, the effective pair cavity length is at least 19 times the effective pump cavity length. In some embodiments, the effective pair cavity length is at least 20 times the effective pump cavity length.

In some embodiments, the effective pair cavity length is at most 2 times the effective pump cavity length. In some embodiments, the effective pair cavity length is at most 3 times the effective pump cavity length. In some embodiments, the effective pair cavity length is at most 4 times the effective pump cavity length. In some embodiments, the effective pair cavity length is at most 5 times the effective pump cavity length. In some embodiments, the effective pair cavity length is at most 6 times the effective pump cavity length. In some embodiments, the effective pair cavity length is at most 7 times the effective pump cavity length. In some embodiments, the effective pair cavity length is at most 8 times the effective pump cavity length. In some embodiments, the effective pair cavity length is at most 9 times the effective pump cavity length. In some embodiments, the effective pair cavity length is at most 10 times the effective pump cavity length. In some embodiments, the effective pair cavity length is at most 11 times the effective pump cavity length. In some embodiments, the effective pair cavity length is at most 12 times the effective pump cavity length. In some embodiments, the effective pair cavity length is at most 13 times the effective pump cavity length. In some embodiments, the effective pair cavity length is at most 14 times the effective pump cavity length. In some embodiments, the effective pair cavity length is at most 15 times the effective pump cavity length. In some embodiments, the effective pair cavity length is at most 16 times the effective pump cavity length. In some embodiments, the effective pair cavity length is at most 17 times the effective pump cavity length. In some embodiments, the effective pair cavity length is at most 18 times the effective pump cavity length. In some embodiments, the effective pair cavity length is at most 19 times the effective pump cavity length. In some embodiments, the effective pair cavity length is at most 20 times the effective pump cavity length.

In some embodiments, the effective pair cavity length is an integer multiple of the effective pump cavity length.

In some embodiments, the cavity lifetime of the photon pair is shorter than 500 ps. In some embodiments, the cavity lifetime of the photon pair is shorter than 400 ps. In some embodiments, the cavity lifetime of the photon pair is shorter than 300 ps. In some embodiments, the cavity lifetime of the photon pair is shorter than 200 ps. In some embodiments, the cavity lifetime of the photon pair is shorter than 100 ps.

Referring to FIG. 1B, first waveguide 104 and second waveguide 114 are formed on substrate 102 and covered by top cladding layer 122. In some embodiments, top cladding layer 122 surrounds first waveguide 104 and second waveguide 114 in conjunction with substrate 102. Optionally, substrate 102 is based on silicon, e.g., is made of silicon or includes a silicon-on-insulator (SOI) substrate. Optionally, first waveguide 104 is at least partially made of silicon or silicon nitride. Alternatively, in some embodiments, the first and second waveguides 104 and 114 are disposed between top cladding layer 122 and bottom cladding layers 124. In some embodiments, the cladding layers and the waveguides are formed and defined on substrate 102 using microfabrication. In some situations, at least one of first waveguide 104 and second waveguide 114 has width 132 that is less than 1 μm (or less than 900 nm, less than 800 nm, less than 700 nm, less than 600 nm, less than 500 nm, less than 400 nm, less than 300 nm, etc.). In some situations, at least one of first waveguide 104 and second waveguide 114 has a width between 300 nm and 500 nm. In some situations, at least one of first waveguide 104 and second waveguide 114 has a feature that is substantially small (e.g., less than 100 nm), and electron beam (e-beam) lithography is used to form, construct, or define substantially small features.

Figure 1C:
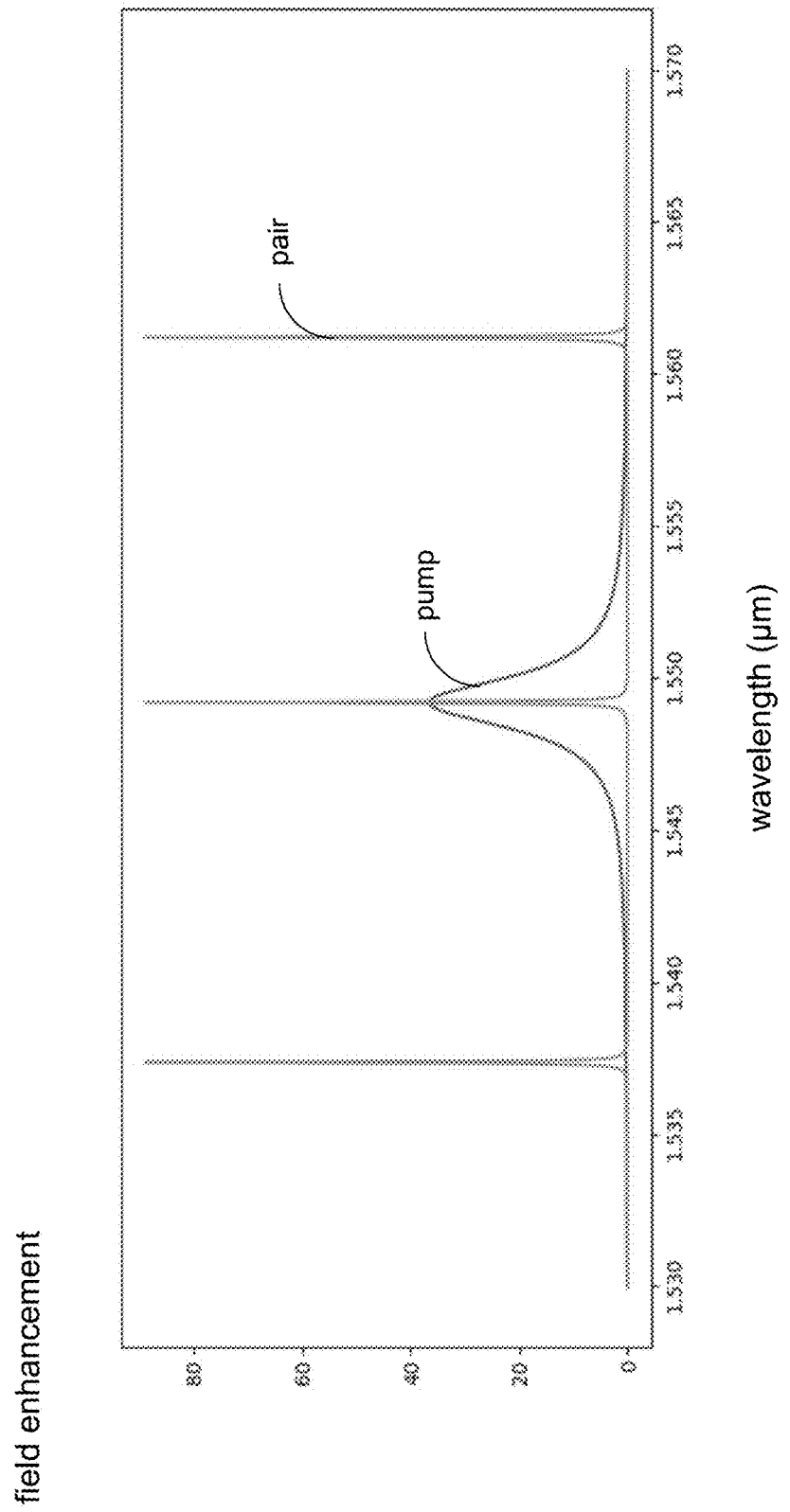
FIG. 1C illustrates field enhancement for the pump cavity and the pair cavity in accordance with some embodiments.

FIG. 1C illustrates (intra cavity) field enhancement for the pump cavity and the pair cavity in accordance with some embodiments. In some embodiments, the field enhancement for the pump cavity is substantially flat within a bandwidth equal to the resonance linewidth of each photon from the pair (e.g., a wavelength range that corresponds to the full width at half maximum of the pair field enhancement overlaps with a peak wavelength of the pump field enhancement). When pumped with a <2 ps pulsed laser, this facilitates a high spectral separability (e.g., >99%, >99.9%, or >99.99%) between the two photons of the photon pair.

Figure 2A:
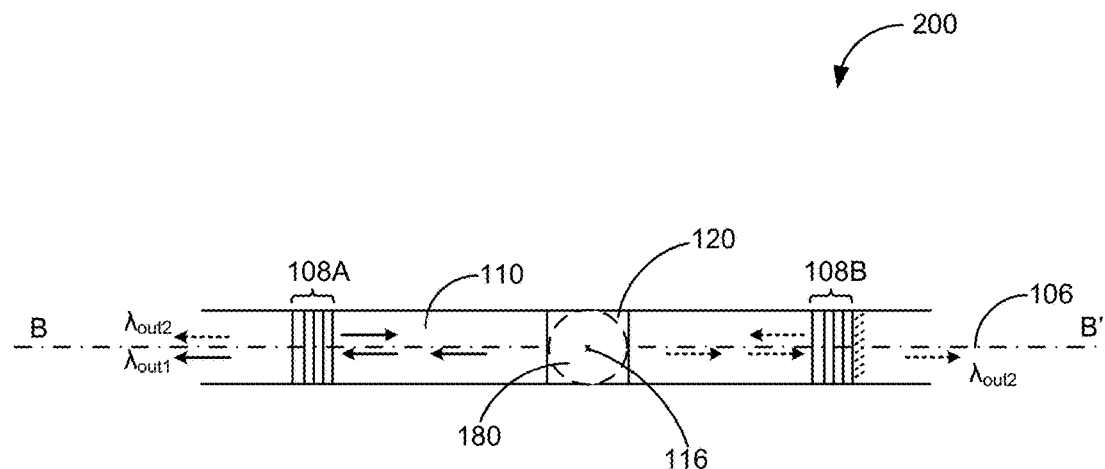
FIG. 2A is a top view of another example photon source device in accordance with some embodiments.
Figure 2B:
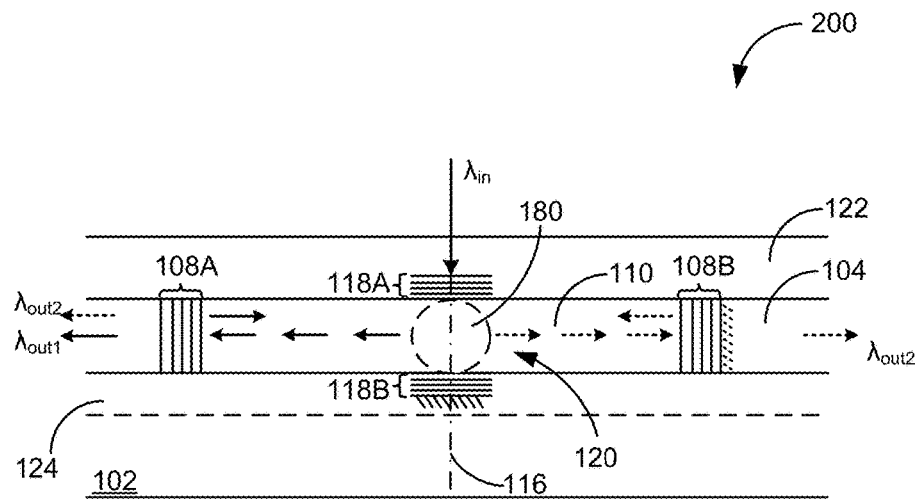
FIG. 2B is a cross-sectional view of the photon source device shown in FIG. 2A in accordance with some embodiments.

FIGS. 2A and 2B illustrate another example photon source device 200 in accordance with some embodiments. Photon source device 200 is similar to photon source device 100 described with respect to FIGS. 1A-1B, except that the second resonant cavity extends in a direction that is not parallel to substrate 102 (e.g., the second resonant cavity extends in a direction that is perpendicular to substrate 102).

FIG. 2A is a top view of photon source device 200, and FIG. 2B is a cross-sectional view of photon source device 200 shown in FIG. 2A. Line BB' in FIG. 2A represents a view from which the cross-section shown in FIG. 2B is taken.

Photon source device 200 includes substrate 102 and first waveguide 104 arranged on substrate 102.

First waveguide 104 extends along first axis 106 (e.g., parallel to line BB'), and is coupled with a first pair of reflectors 108 (e.g., 108A and 108B) defining first resonant cavity 110 in first waveguide 104. First resonant cavity 110 is configured for a first output wavelength $\lambda_{out1}$ and a second output wavelength $\lambda_{out2}$ (e.g., the cavity length of first resonant cavity 110 is an integer multiple of ($\lambda_{out1}/2n$) and also an integer multiple of ($\lambda_{out2}/2n$)). The first pair of reflectors 108 includes a partial reflector for the first output wavelength $\lambda_{out1}$ and a partial reflector for the second output wavelength $\lambda_{out2}$.

Photon source device 200 also includes a second pair of reflectors 118 defining second resonant cavity 120 extending along second axis 116 that is non-parallel to first axis 106. Second resonant cavity 120 intersects with first resonant cavity 110, and is configured for an input wavelength $\lambda_{in}$ that is distinct from the first output wavelength $\lambda_{out1}$ and the second output wavelength $\lambda_{out2}$ (e.g., the cavity length of second resonant cavity 120 is an integer multiple of ($\lambda_{in}/2n$), where n is a refractive index of material between the second pair of reflectors 118). First reflector 118A of the second pair of reflectors 118 has a first reflectance for the input wavelength $\lambda_{in}$, and a second reflector 118B of the second pair of reflectors 118 has a second reflectance for the input wavelength $\lambda_{in}$. In some embodiments, the second reflectance is distinct from the first reflectance (e.g., the second reflectance is greater than the first reflectance).

In some embodiments, second resonance cavity 120 is formed using a distinct waveguide (e.g., in some embodiments, photon source device 200 includes a second waveguide that is distinct from the first waveguide and includes the second pair of reflectors 118). In some embodiments, second resonant cavity 120 is not associated with a separate and distinct second waveguide. Rather, second resonant cavity 120 is formed based on (or within) first waveguide 104. Referring to FIG. 2B, first resonant cavity 110 of first waveguide 104 includes interaction region 180. In FIG. 2B, first reflector 118A and second reflector 118B of the second pair of reflectors 118 are disposed on top of and below interaction region 180 of first waveguide 104, respectively. FIG. 2A shows that interaction region 180 is only a part, less than all, of first resonant cavity 110 of first waveguide 104, and FIG. 2B shows that, in some embodiments, interaction region 180 constitutes a part or all of second resonant cavity 120.

Referring to the cross-sectional view shown in FIG. 2B, first axis 106 and second axis 116 intersect with each other and define a common plane. In some embodiments, the common plane is substantially perpendicular to a planar surface of substrate 102. In FIG. 2B, an input light of the input wavelength $\lambda_{in}$ enters second cavity 116 along a direction that is not parallel to the planar surface of substrate 102 (e.g., the direction is substantially perpendicular to the planar surface of substrate 102). In some embodiments, the direction of the input light is substantially parallel to second axis 116. Referring to FIG. 2A, for example, the direction of the input light intersects with first axis 106 at an angle that is substantially equal to 90 degrees. It is noted that in some implementations, the direction of the input light intersects with first axis 106 at an angle that is not equal to 90 degrees (e.g., at least 85 degrees, at least 80 degrees, at least 75 degrees, at least 70 degrees, at least 65 degrees, at least 60 degrees, at least 55 degrees, at least 50 degrees, 45 degrees, etc.).

For example, photon source device 200 receives the input light of the input wavelength $\lambda_{in}$. For example, photon source device 200 is coupled to a laser light source directly or indirectly, where the laser light source is configured (e.g., by including a gain material that is suitable for generating or providing the input light of the input wavelength $\lambda_{in}$ and/or having an optical resonant cavity having a cavity length suitable for generating or providing the input wavelength $\lambda_{in}$) to provide the input light of the input wavelength $\lambda_{in}$. In FIGS. 2A and 2B, the input light of the input wavelength $\lambda_{in}$ enters photon source device 200 through top cladding layer 122. The input light of the input wavelength $\lambda_{in}$ passes through first reflector 118A of the second pair of reflectors 118 and enters second resonant cavity 120 (specifically, interaction region 180). Two ends of second resonant cavity 120 are defined by first reflector 118A and second reflector 118B, respectively, which cause the input light of the input wavelength $\lambda_{in}$ to reflect therebetween. In some embodiments, the second reflectance of second reflector 118B is greater than the first reflectance of first reflector 118A for the input wavelength $\lambda_{in}$, and reflects a substantial portion of the input light of input wavelength $\lambda_{in}$, thereby causing the input light of the input wavelength $\lambda_{in}$ to resonate between the first and second reflectors 118A and 118B.

At least a portion of interaction region 180 is filled with a non-linear optical medium that causes conversion of the input light of the input wavelength $\lambda_{in}$. In some embodiments, interaction region 180 is completely filled with the non-linear optical medium. The optical conversion processes are described herein with respect to FIGS. 1A and 1B, and such details are not repeated herein.

Referring to FIG. 2B, first waveguide 104 is formed on substrate 102 and covered by top cladding layer 122. In some embodiments, first reflector 118A and second reflector 118B of the second pair of reflectors 118 are formed on top of and below interaction region 180 of first waveguide 104.

Figure 2C:
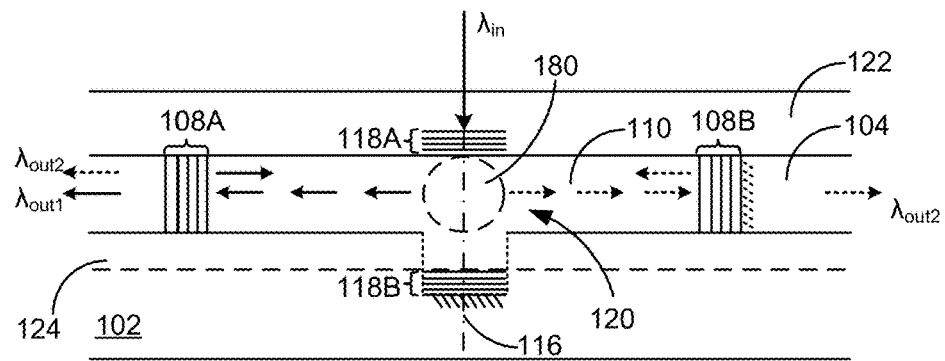
FIGS. 2C-2E illustrate cross-sectional views of example photon source devices in accordance with some embodiments.
Figure 2D:
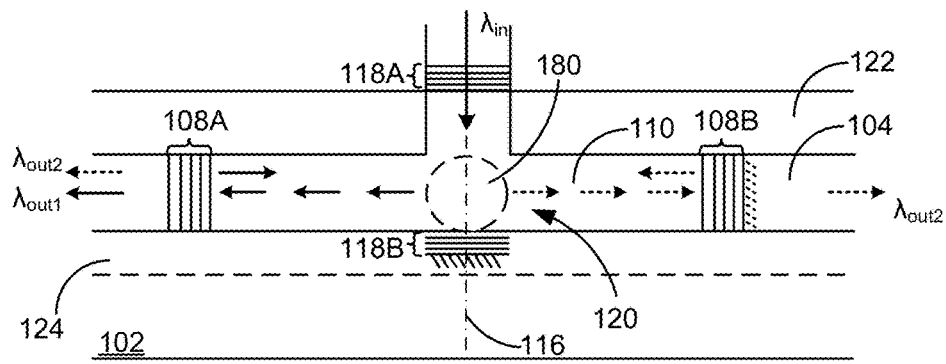
Figure 2E:
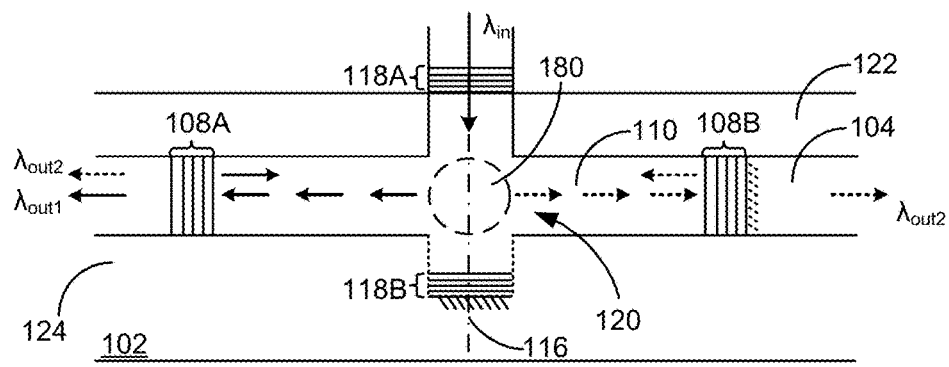

In some embodiments, at least one of the second pair of reflectors 118 is not formed directly adjacent to interaction region 180 of first waveguide 104. FIGS. 2C-2E illustrate cross-sectional views of example photon source devices in accordance with some embodiments.

FIG. 2C shows that a trench is formed in substrate 102 (and/or bottom cladding layer 124) to define a second waveguide. In FIG. 2C, reflector 118A of the second pair of reflectors 118 is located adjacent to interaction region 180 of first waveguide 104, while reflector 118B of the second pair of reflectors 118 is located away from interaction region 180 of first waveguide 104.

FIG. 2D shows that a trench is formed in top cladding layer 122 to define a second waveguide. In FIG. 2D, reflector 118A of the second pair of reflectors 118 is located away from interaction region 180 of first waveguide 104, while reflector 118B of the second pair of reflectors 118 is located adjacent to interaction region 180 of first waveguide 104.

FIG. 2E shows that trenches are formed in substrate 102 (and/or bottom cladding layer 124) and in top cladding layer 122 to define a second waveguide. In FIG. 2E, reflector 118A of the second pair of reflectors 118 is located away from interaction region 180 of first waveguide 104 and reflector 118B of the second pair of reflectors 118 is located away from interaction region 180 of first waveguide 104.

Figure 3A:
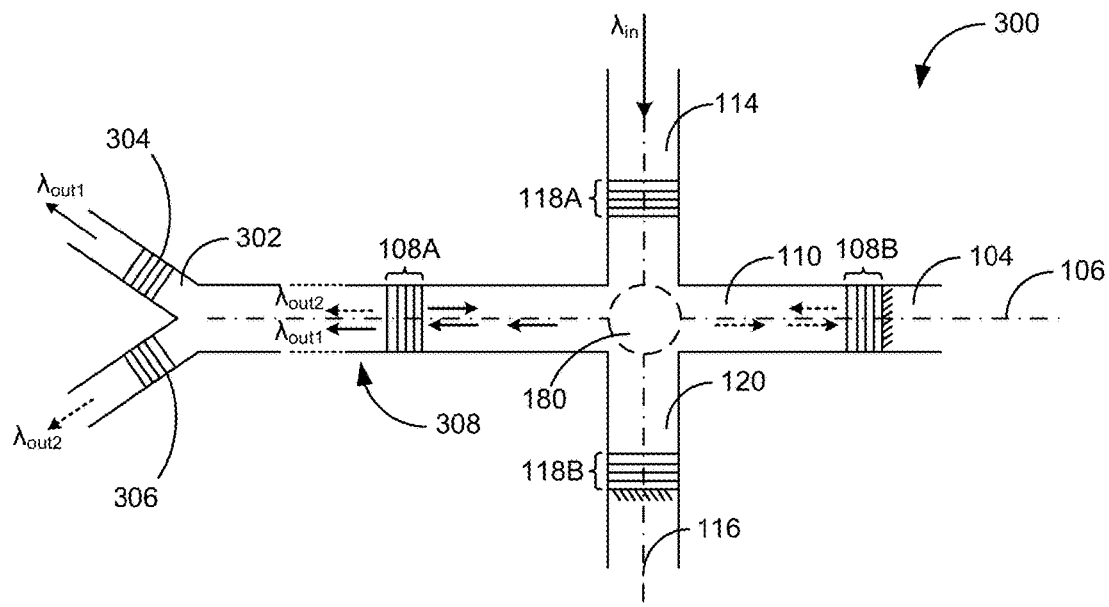
FIG. 3A illustrates an example photon source device that outputs photons from a single end of a waveguide in accordance with some embodiments.

FIG. 3A illustrates example photon source device 300 that outputs photons from a single end of a waveguide in accordance with some embodiments. As explained above, in some embodiments, after photons of the first output wavelength $\lambda_{out1}$ and photons of the second output wavelength $\lambda_{out2}$ are generated in interaction region 180, both of them are outputted from first waveguide 104 via first reflector 108A of the first pair of reflectors 108. First reflector 108A of the first pair of reflectors 108 serves as both the partial reflector for the first output wavelength $\lambda_{out1}$ and the partial reflector for the second output wavelength $\lambda_{out2}$. First reflector 108A has a reflectance less than a predetermined reflectance threshold for both the first output wavelength $\lambda_{out1}$ and the second output wavelength $\lambda_{out2}$ (e.g., <98%, such as 95%), such that first reflector 108A allows at least a portion of the photons of the first output wavelength $\lambda_{out1}$ and the photons of the second output wavelength $\lambda_{out2}$ to leave first resonant cavity 110. Conversely, in some embodiments, second reflector 108B of the first pair of reflectors 108 has a reflectance for the first output wavelength $\lambda_{out1}$ that is greater than a respective reflectance threshold (e.g., >% 98, such as 99.9%) and a reflectance for the second output wavelength $\lambda_{out2}$ that is greater than the respective reflectance threshold (e.g., >% 98, such as 99.9%), such that second reflector 108B reflects a substantial portion of the light of the first and second output wavelengths $\lambda_{out1}$ and $\lambda_{out2}$. Sometimes, second reflector 108B of the first pair of reflectors 108 is regarded as fully reflective to the photons of the first output wavelength $\lambda_{out1}$ and the photons of the second output wavelength $\lambda_{out2}$. That said, when first reflector 108A is used to output both of the output wavelengths $\lambda_{out1}$ and $\lambda_{out2}$, first reflector 108A has a reflectance less than a reflectance of second reflector 108B for the output wavelengths $\lambda_{out1}$ and $\lambda_{out2}$.

Photons of the first output wavelength $\lambda_{out1}$ and the second output wavelength $\lambda_{out2}$ are generated in pair. One of a pair of photons has the first output wavelength $\lambda_{out1}$ and the other of the pair of photons has the second output wavelength $\lambda_{out2}$. One of the pair of photons is called a signal photon, and the other one of the pair of photons is called an idler photon associated with the signal photon. In FIG. 3A, the signal photons in the corresponding photon pairs resonate in first resonant cavity 110, and pass through at least first reflector 108A to exit first resonant cavity 110. The idler photons in the corresponding photon pairs also pass through at least first reflector 108A to exit first resonant cavity 110. In these embodiments, the signal photons have one of the first output wavelength $\lambda_{out1}$ and the second output wavelength $\lambda_{out2}$, and the idler photons have the other of the first output wavelength $\lambda_{out1}$ and the second output wavelength $\lambda_{out2}$.

First reflector 108A of the first pair of reflectors 108 is located in proximity to single end 308 of first waveguide 104 from which the photons of the output wavelengths are outputted. First waveguide 104 is coupled to an optical splitter 302 configured to spatially separate the photons of the first output wavelength $\lambda_{out1}$ and the photons of the second output wavelength $\lambda_{out2}$ outputted through first reflector 108A of the first pair of reflectors 108. In some embodiments, like the first and second waveguides, optical splitter 302 is arranged on substrate 102, and prepared using microfabrication. Alternatively, in some embodiments, the single end of first waveguide 104 is exposed on a top surface of substrate 102, and the splitter is an external component coupled to the single end of first waveguide 104 in a hybrid manner (e.g., first waveguide 104 and the splitter are coupled using one or more grating couplers). In some embodiments, optical splitter 302 includes first reflector 304 for a first output channel of optical splitter 302 (e.g., optical splitter 302 includes a first distributed Bragg reflector that transmits the photons of the first output wavelength $\lambda_{out1}$ and reflect the photons of the second output wavelength $\lambda_{out2}$) and second reflector 306 for a second output channel of optical splitter 302 (e.g., optical splitter 302 includes a first distributed Bragg reflector that reflects the photons of the first output wavelength $\lambda_{out1}$ and transmit the photons of the second output wavelength $\lambda_{out2}$).

Figure 3B:
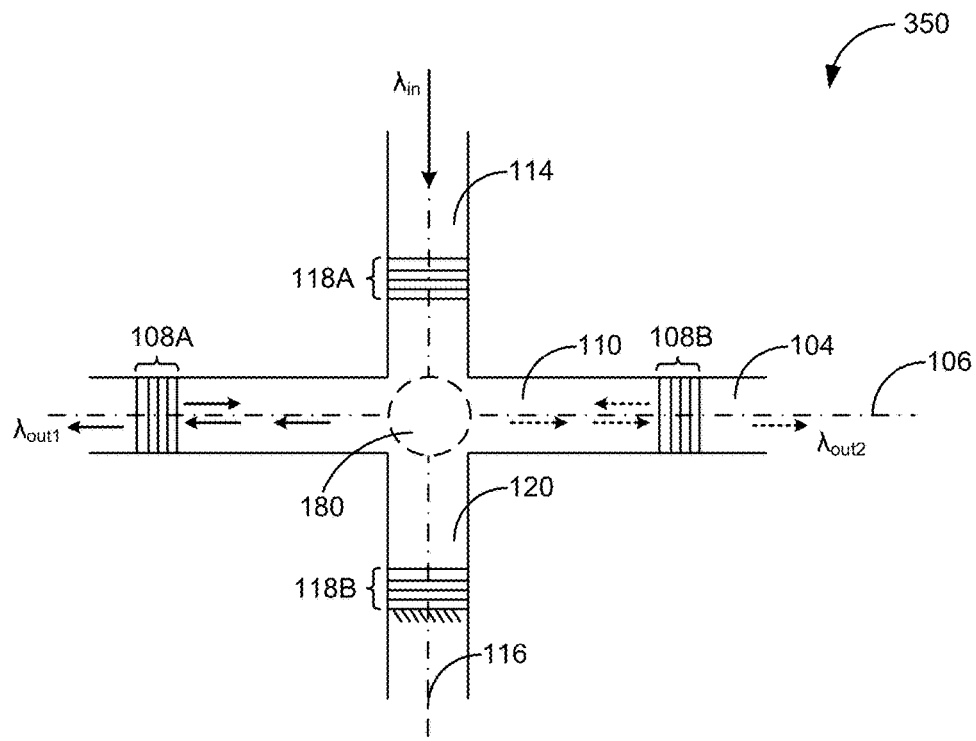
FIG. 3B illustrates another example photon source device that outputs photons from two distinct ends of a waveguide in accordance with some embodiments.

FIG. 3B illustrates another example photon source device 350 that outputs photons from two distinct ends of a waveguide in accordance with some embodiments. As explained above, in some embodiments, first waveguide 104 is configured to output the photons of the first output wavelength $\lambda_{out1}$ and the photons of the second output wavelength $\lambda_{out2}$ separately through first reflector 108A and second reflector 108B of the first pair of reflectors 108, respectively. For example, a substantial portion of the photons of the first output wavelength $\lambda_{out1}$ is outputted via first reflector 108A, which serves as the partial reflector for the first output wavelength $\lambda_{out1}$. A substantial portion of the photons of the second output wavelength $\lambda_{out2}$ is outputted via second reflector 108B, which serves as the partial reflector for the second output wavelength $\lambda_{out2}$. In some situations, first reflector 108A has a reflectance for passing the photons of the first output wavelength $\lambda_{out1}$ and block (or reflect) the photons of the second output wavelength $\lambda_{out2}$. For example, the reflectance of first reflector 108A is less than a predetermined reflectance threshold for the first output wavelength $\lambda_{out1}$, but greater than a predetermined reflectance threshold for the second output wavelength $\lambda_{out2}$. Similarly, in some situations, second reflector 108B has a reflectance for blocking (or reflecting) the photons of the first output wavelength $\lambda_{out1}$ and pass the photons of the second output wavelength $\lambda_{out2}$. For example, the reflectance of second reflector 108B is greater than the predetermined reflectance threshold for the first output wavelength $\lambda_{out1}$, but less than the predetermined reflectance threshold for the second output wavelength $\lambda_{out2}$.

In some embodiments, at least one reflector of the first pair of reflectors 108 and the second pair of reflectors 118 includes a distributed Bragg reflector. Optionally, the distributed Bragg reflector includes a plurality of layers of alternating materials with varying refractive index. Optionally, the distributed Bragg reflector includes a periodic variation of a characteristic (e.g., a thickness and/or a width) of the plurality of layers.

Figure 4A:
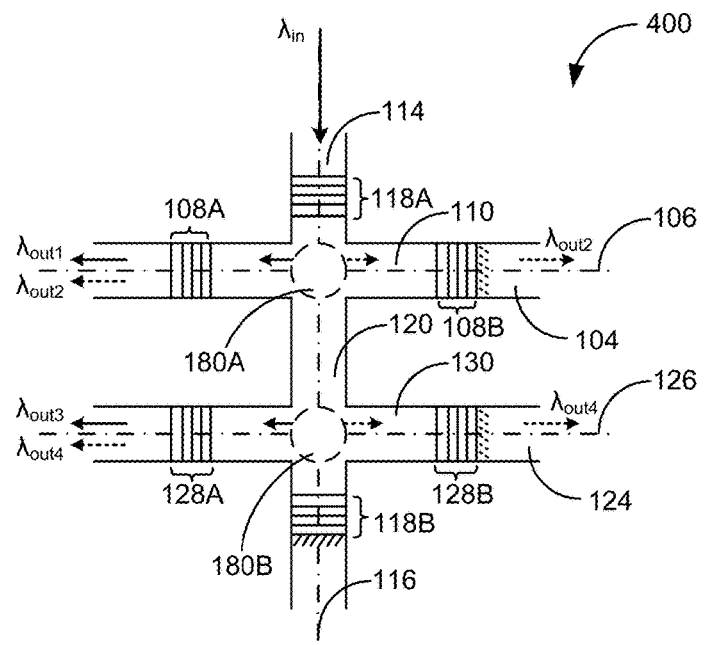
FIG. 4A illustrates an example photon source device having a plurality of waveguides in accordance with some embodiments.
Figure 4B:
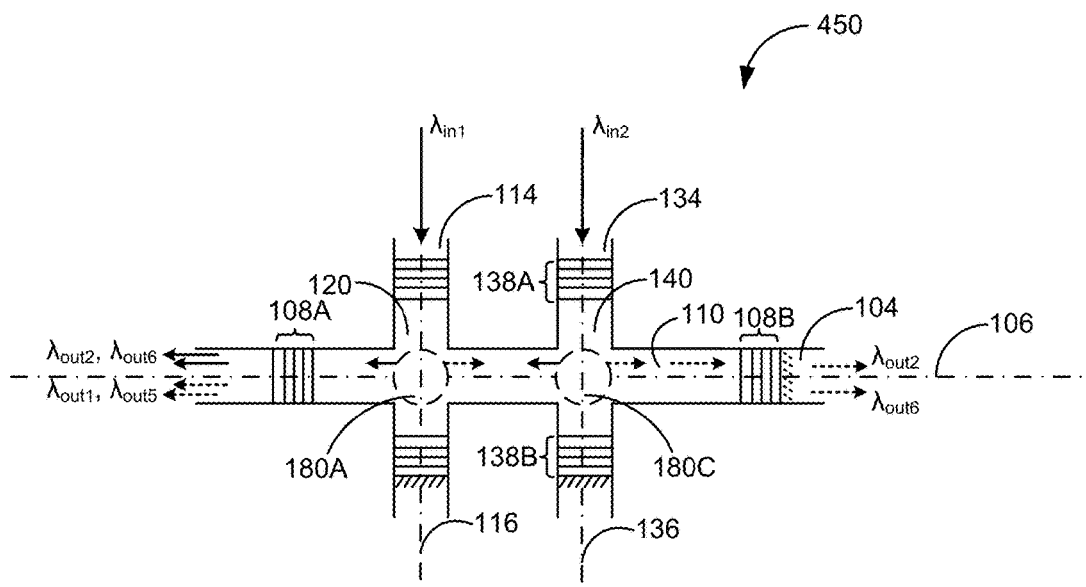
FIG. 4B illustrates an example photon source device having a plurality of waveguides in accordance with some embodiments.

FIGS. 4A and 4B illustrate example photon source devices 400 and 450 each having a plurality of waveguides in accordance with some embodiments. In photon source devices 400 and 450, the plurality of waveguides includes first waveguide 104 extending along first axis 106 and second waveguide 114 extending along second axis 116 that is non-parallel to first axis 106. Second waveguide 114 includes a second pair of reflectors 118 defining second resonant cavity 120. Second resonant cavity 120 is configured for receiving and causing resonance of input light of an input wavelength $\lambda_{in}$ (e.g., the cavity length of second resonant cavity 120 is an integer multiple of ($\lambda_{in}$/2n), where n is a refractive index of material between the second pair of reflectors 118). First waveguide 104 is coupled with a first pair of reflectors 108 defining first resonant cavity 110 in first waveguide 104. First resonant cavity 110 intersects with second resonant cavity 120 at first interaction region 180A. In accordance with a parametric process, input light of the input wavelength $\lambda_{in}$ interacts with a non-linear optical medium in first interaction region 180A and creates photons of a first output wavelength $\lambda_{out1}$ and a second output wavelength $\lambda_{out2}$. As a result, first waveguide 104 outputs light (e.g., photons) of the first output wavelength $\lambda_{out1}$ and the second output wavelength $\lambda_{out2}$. In some embodiments, the photons of the first output wavelength $\lambda_{out1}$ and the photons of the second output wavelength $\lambda_{out2}$ are outputted from a same end of first waveguide 104. In some embodiments, the photons of the first output wavelength $\lambda_{out1}$ and the photons of the second output wavelength $\lambda_{out2}$ are outputted from separate ends of first waveguide 104 (e.g., the photons of the first output wavelength $\lambda_{out1}$ are outputted from a first end of first waveguide 104 and the photons of the second output wavelength $\lambda_{out2}$ are outputted from a second end, opposite to the first end, of first waveguide 104).

Referring to FIG. 4A, photon source device 400 is configured to receive the input light of the input wavelength $\lambda_{in}$ from second waveguide 114 (e.g., second waveguide 114 is coupled with an input light source), but output photons along two or more separate and distinct waveguides. For this purpose, photon source device 400 includes at least a third waveguide 124 in addition to the first and second waveguides 104 and 114. Third waveguide 124 is arranged on substrate 102 on which the first and second waveguides 104 and 114 are arranged. Third waveguide 124 extends along third axis 126, and is coupled with a third pair of reflectors 128. Optionally, third axis 126 of third waveguide 124 is substantially parallel to first axis 106 of first waveguide 104 (e.g., in some implementations, third waveguide 124 does not intersect with first waveguide 104). The third pair of reflectors 128 define third resonant cavity 130 in third waveguide 124 for a third output wavelength $\lambda_{out3}$, that is distinct from the input wavelength $\lambda_{in}$, and a fourth output wavelength $\lambda_{out4}$ that is distinct from the input wavelength $\lambda_{in}$. Second resonant cavity 120 intersects with third resonant cavity 130 at second interaction region 180B. Second interaction region 180B is distinct and separate from first interaction region 180A in second resonant cavity 120. In FIG. 4A, both first interaction region 180A and second interaction region 180B are located between the second pair of reflectors 118 and in second resonant cavity 120 (e.g., within second waveguide 114).

Both interaction regions 180A and 180B are located on a path of input light of the input wavelength $\lambda_{in}$ traveling in second resonant cavity 120. Each of interaction regions 180A and 180B is at least partially filled with a respective non-linear optical medium that initiates an optical conversion on the input light of the input wavelength $\lambda_{in}$. In accordance with the respective conversion process in interaction region 180A or 180B, the input light of the input wavelength $\lambda_{in}$ interacts with the respective non-linear linear optical medium and generates photons of the respective output wavelengths that are distinct from the input wavelength $\lambda_{in}$. In some embodiments, the non-linear optical media in interaction regions 180A and 180B are distinct from each other. Alternatively, in some embodiments, the non-linear optical media in interaction regions 180A and 180B are identical.

In some embodiments, at least one of the third output wavelength $\lambda_{out3}$ and the fourth output wavelength $\lambda_{out4}$ generated in second interaction region 180B is distinct from the first output wavelength $\lambda_{out1}$ and the second output wavelength $\lambda_{out2}$ generated in first interaction region 180A. In a specific example, the first, second, third and fourth output wavelengths are all distinct (e.g., none of the first, second, third and fourth output wavelengths is identical to the rest of the first, second, third and fourth output wavelengths).

In some embodiments, each of the third output wavelength $\lambda_{out3}$ and the fourth output wavelength $\lambda_{out4}$ generated in second interaction region 180B corresponds to one of the first output wavelength $\lambda_{out1}$ and the second output wavelength $\lambda_{out2}$ generated in first interaction region 180A.

In some embodiments, when the photons of the third output wavelength $\lambda_{out3}$ and the fourth output wavelength $\lambda_{out4}$ are generated in second interaction region 180B, they are outputted from the third waveguide 124 through one of the third pair of reflectors 128. For example, one of the third pair of reflectors 128 (e.g., reflector 128A) serves as a partial reflector for the third output wavelength $\lambda_{out3}$ and a partial reflector for fourth output wavelength $\lambda_{out4}$, allowing at least a portion of the photons of the third output wavelength $\lambda_{out3}$ and the fourth output wavelength $\lambda_{out4}$ to exit from the third resonant cavity 130. In some embodiments, one of the third pair of reflectors 128 serves as a partial reflector for the third output wavelength and a partial reflector for the fourth output wavelength, the other reflector of the third pair of reflectors 128 serves as a full reflector for both the third output wavelength and the fourth output wavelength (e.g., the other reflector of the third pair of reflectors 128 has a reflectance above a predefined threshold, such as >98%, for the third output wavelength and the fourth output wavelength). Alternatively, in some embodiments, the third waveguide 124 is configured to output the photons of the third output wavelength $\lambda_{out3}$ and the photons of the fourth output wavelength $\lambda_{out4}$ separately through first reflector 128A and second reflector 128B of the third pair of reflectors 128, respectively. For example, a substantial portion of the photons of the third output wavelength $\lambda_{out3}$ is outputted via first reflector 128A, which serves as the partial reflector for the third output wavelength $\lambda_{out3}$. A substantial portion of the photons of the fourth output wavelength $\lambda_{out4}$ is outputted via second reflector 128B, which serves as the partial reflector for the fourth output wavelength $\lambda_{out4}$. In some cases, first reflector 128A has a reflectance above a predefined threshold (e.g., >98%, such as 99.9%) for the fourth output wavelength and second reflector 128B has a reflectance above a predefined threshold (e.g., >98%, such as 99.9%) for the third output wavelength. More details on outputting photons from a waveguide are explained above with reference to FIGS. 3A and 3B.

In some embodiments, the first, second and third waveguides are all arranged on substrate 102. The first, second and third axes, along which the first, second and fourth waveguides extend, are located on a common plane that is substantially parallel to a planar surface of substrate 102. In some embodiments, three or more waveguides intersect with the same second waveguide 114 for outputting photons. The three or more waveguides include an integer number of waveguides, and the integer number is, for example, in a range between 3 and 16. In some embodiments, the three or more waveguides are substantially parallel to one another.

In FIG. 4A, photon source device 400 is coupled to a single input light source but includes two or more output waveguides, thereby enabling two or more interaction regions to generate photons or photon pairs independently (and optionally, concurrently). Thus, photon source device 400 has an increased yield in generating photon pairs compared to photon source device 100 having a single interaction region.

Referring to FIG. 4B, photon source device 450 is configured to receive input light from two or more separate and distinct waveguides and output photons via first waveguide 104. For this purpose, photon source device 450 further includes at least fourth waveguide 134 in addition to first and second waveguides 104 and 114. Fourth waveguide 134 is arranged on substrate 102 and extends along fourth axis 136. Optionally, fourth axis 136 of fourth waveguide 134 is substantially parallel to second axis 116 of second waveguide 114. Fourth waveguide 134 is coupled with a fourth pair of reflectors 138. Fourth pair of reflectors 138 define fourth resonant cavity 140 in fourth waveguide 134 for a second input wavelength $\lambda_{in2}$, while photons traveling in second resonant cavity 120 have a first input wavelength $\lambda_{in1}$. First reflector 138A of fourth pair of reflectors 138 is a partial reflector for the second input wavelength $\lambda_{in2}$, and second reflector 138B of the fourth pair of reflectors 138 has a reflectance for the second input wavelength $\lambda_{in2}$ that is greater than a reflectance of first reflector 138A of the fourth pair of reflectors 138 for the second input wavelength $\lambda_{in2}$. First resonant cavity 110 intersects with fourth resonant cavity 140 at third interaction region 180C. Third interaction region 180C is distinct and separate from first interaction region 180A. Both first interaction region 108A and third interaction region 180C are located between the first pair of reflectors 108 and in first resonant cavity 110 (e.g., within first waveguide 104).

Optionally, the second input wavelength $\lambda_{in2}$ is substantially identical to the first input wavelength $\lambda_{in1}$. Optionally, the second input wavelength $\lambda_{in2}$ is distinct from the first input wavelength $\lambda_{in1}$.

Interaction region 180C is located on a path of input light of the second input wavelength $\lambda_{in2}$ traveling in fourth resonant cavity 140. Interaction region 180C is at least partially filled with a respective non-linear optical medium that initiates an optical conversion of the input light of the second input wavelength $\lambda_{in2}$. In accordance with the conversion process in interaction region 180C, the input light of the second input wavelength $\lambda_{in2}$ interacts with the non-respective linear optical medium and generates photons of two additional output wavelengths (a fifth output wavelength $\lambda_{out5}$ and a sixth output wavelength $\lambda_{out6}$) that are distinct from the second input wavelength $\lambda_{in2}$. In some embodiments, the non-linear optical media in interaction regions 180A and 180C are distinct from each other. Alternatively, in some embodiments, the non-linear optical media in interaction regions 180A and 180C are identical.

In some embodiments, at least one of the fifth output wavelength $\lambda_{out5}$ and the sixth output wavelength $\lambda_{out6}$ generated in third interaction region 180C is distinct from both the first output wavelength $\lambda_{out1}$ and the second output wavelength $\lambda_{out2}$ generated in first interaction region 180A. In a specific example, the first, second, fifth and sixth output wavelengths are all distinct (e.g., because input wavelengths $\lambda_{in1}$ and $\lambda_{in2}$ are distinct from each other, because non-linear optical media in interaction regions 180A and 180C are distinct from each other, and/or because a cavity length of fourth resonant cavity 140 is distinct from a cavity length of first resonant cavity 120).

In some embodiments, each of the fifth output wavelength $\lambda_{out5}$ and the sixth output wavelength $\lambda_{out6}$ generated in third interaction region 180C corresponds to one of the first output wavelength $\lambda_{out1}$ and the second output wavelength $\lambda_{out2}$ generated in first interaction region 180A.

In some embodiments, photons of the fifth output wavelength $\lambda_{out5}$ and the sixth output wavelength $\lambda_{out6}$ generated in third interaction region 180C are outputted from first waveguide 104 via one reflector of the first pair of reflectors 108. The one reflector of the first pair of reflectors 108 serves as a partial reflector for the fifth output wavelength $\lambda_{out5}$ and a partial reflector for the sixth output wavelength $\lambda_{out6}$, allowing at least a portion of the photons of the fifth output wavelength $\lambda_{out5}$ and the sixth output wavelength $\lambda_{out6}$ to exit from first resonant cavity 110 (e.g., the one reflector has a reflectance less than a predefined threshold (e.g., <95%, such as 90%, 50%, 10%, 1%, or 0%) for both the fifth output wavelength and the sixth output wavelength). In some embodiments, the other reflector of the first pair of reflectors 108 has a reflectance greater than a predefined threshold (e.g., >95%, such as 99%) for both the first output wavelength and the sixth output wavelength. As such, in some implementations, photons of the first, second, fifth and sixth output wavelengths are all collected at one end of first waveguide 104.

In some other embodiments, first waveguide 104 is configured to output the photons of the fifth output wavelength $\lambda_{out5}$ and the sixth output wavelength $\lambda_{out6}$ separately through first reflector 108A and second reflector 108B of the first pair of reflectors 108. For example, a substantial portion of the photons of the fifth output wavelength $\lambda_{out5}$ is outputted via first reflector 108A, which serves as the partial reflector for the fifth output wavelength $\lambda_{out5}$ (e.g., having a reflectivity of 98% of less, such as 95%, 50%, 10%, or 0%, for the fifth output wavelength). A substantial portion of the photons of the sixth output wavelength $\lambda_{out6}$ is outputted via second reflector 108B, which serves as the partial reflector for the sixth output wavelength $\lambda_{out6}$ (e.g., having a reflectivity of 98% of less, such as 95%, 50!, 10%, or 0%, for the sixth output wavelength). In some embodiments, first reflector 108A has a reflectivity of 98% or greater, such as 99.9%, for the sixth output wavelength, and second reflector 108B has a reflectivity of 98% of greater, such as 99.9%, for the fifth output wavelength. As such, in some embodiments, photons of one of the first and second output wavelengths and one of the fifth and sixth output wavelengths are collected at a first end of first waveguide 104 that is in proximity to first reflector 108A, and photons of the other of the first and second output wavelengths and the other of the fifth and sixth output wavelengths are collected at a second end of first waveguide 104 that is in proximity to second reflector 108B. Other configurations are also possible. For example, in some implementations, photons of the first output wavelength are outputted through reflector 108A and photons of the second, fifth and sixth output wavelengths are outputted through reflector 108B. In some other implementations, photons of the first, second, and fifth output wavelengths are outputted through reflector 108A and photons of the sixth output wavelength are outputted through reflector 108B.

The first, second and fourth waveguides are all arranged on substrate 102. The first, second and fourth axes, along which the first, second and fourth waveguides extend, are located on a common plane that is substantially parallel to a planar surface of substrate 102. In some embodiments, three or more waveguides intersect with the same first waveguide 104 and provide input lights to generate photons that can be outputted via the same first waveguide 104. The three or more waveguides include an integer number of waveguides, and the integer number is, for example, in a range between 3 and 16. In some embodiments, the three or more waveguide are substantially parallel to one another.

In FIG. 4B, photon source device 450 is coupled to more than one input light source (or multiple channels of light from one or more light sources), thereby providing two or more interaction regions for generating photons or photon pairs independently (and optionally, concurrently) for emission via a single output waveguide. Thus, photon source device 450 has an increased yield in generating photon pairs compared to photon source device 100 having a single interaction region.

Figure 4C:
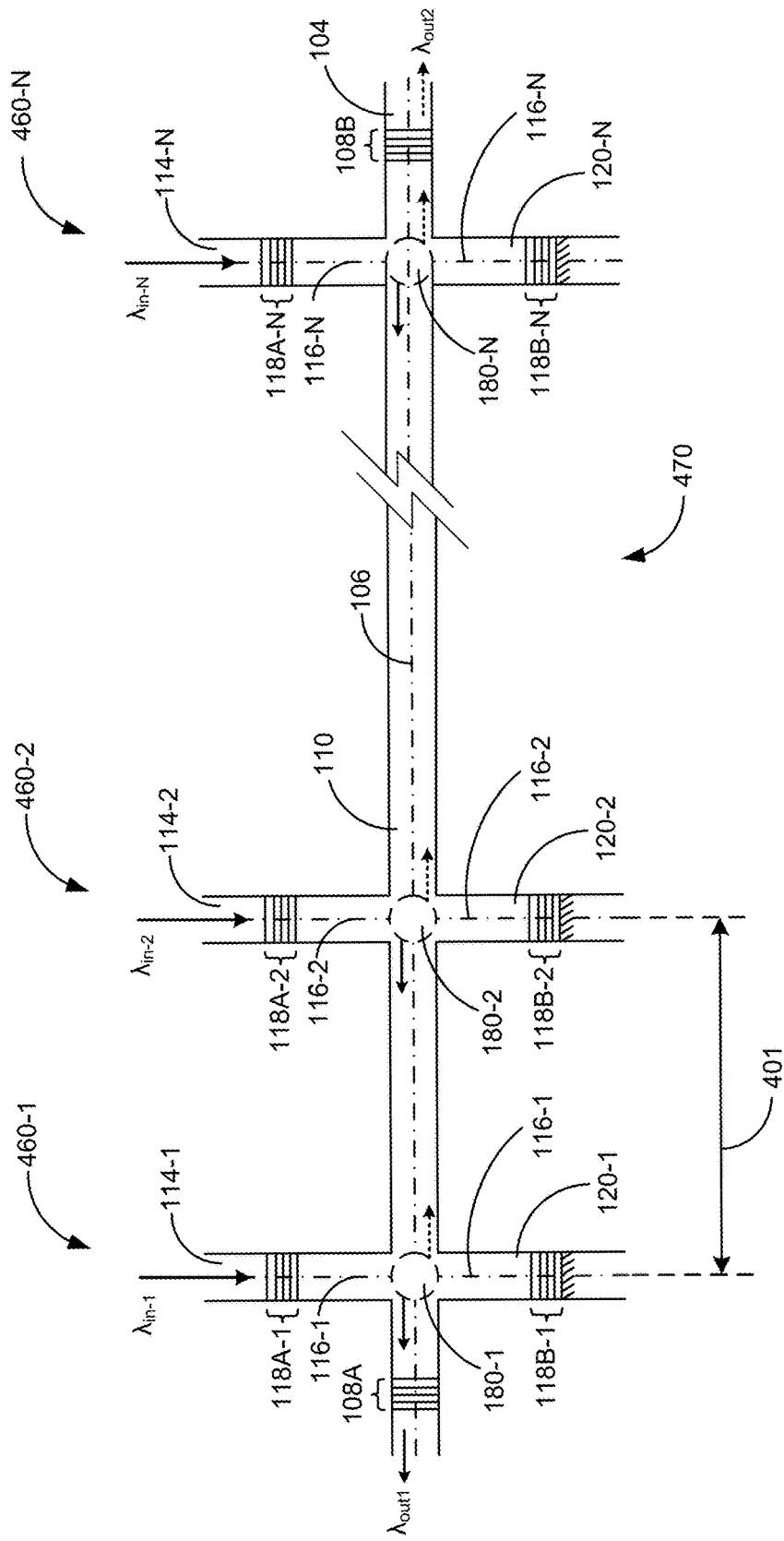
FIG. 4C illustrates an example photon source device having a plurality of waveguides in accordance with some embodiments.

FIG. 4C illustrates an example photon source device having a plurality of waveguides in accordance with some embodiments.

The configuration shown in FIG. 4C enables a plurality of interaction regions 180 (e.g., 180-1, 180-2, 180-N) to generate one or more photons or photon pairs, thus allowing for an increased yield in generating photon pairs compared to photon device 100 having a single interaction region.

In FIG. 4C, photon source device 470 includes output waveguide 104 extending along output axis 106 and a plurality of input waveguides (e.g., 114-1, 114-2, 114-N). In some embodiments, output waveguide 104 and the plurality of input waveguides (e.g., 114-1, 114-2, 114-N) are arranged on a substrate. A respective input waveguide of the plurality of input waveguides 114 extends along a respective input axis (e.g., 116-1, 116-2, 116-N). The respective input waveguide of the plurality of input waveguides 114 intersects with output waveguide 104 at a respective interaction region (e.g., 180-1, 180-2, 180-N) of a plurality of interaction regions. A respective input axis of the plurality of input axes 116 (e.g., 116-1, 116-2, 116-N) is non-parallel to output axis 106 (e.g., the respective input axis is perpendicular to output axis 106). In some embodiments, the plurality of input axes is parallel to one another.

A respective input waveguide of the plurality of input waveguides 114 (e.g., 114-1, 114-2, 114-N) is coupled to one or more input light sources that illuminates a respective interaction region of the plurality of input regions 180 (e.g., 180-1, 180-2, and 180-N) to produce a photon or a pair of photons. In some embodiments, a respective input axis (e.g., 116-1, 116-2, 116-N) is spaced apart from one or more adjacent input axes by distance 401. In some embodiments, a respective interaction region of the plurality of interaction regions 180 (e.g., 180-1, 180-2, 180-N) is separated from one or more adjacent interaction regions by the same distance 401.

In some embodiments, a respective input waveguide of the plurality of input waveguides 114 (e.g., 114-1, 114-2, . . . , 114-N) is coupled to a same input light source (e.g., wavelengths $\lambda_{in\text{-}1}$, $\lambda_{in\text{-}2}$, and $\lambda_{in\text{-}N}$ are identical). In some embodiments, a respective input waveguide of the plurality of input waveguides 114 (e.g., 114-1, 114-2, . . . , 114-N) is coupled to one of a plurality of light sources (e.g., at least one of wavelengths $\lambda_{in\text{-}1}$, $\lambda_{in\text{-}2}$, . . . , and $\lambda_{in\text{-}N}$ is different from the rest of wavelengths $\lambda_{in\text{-}1}$, $\lambda_{in\text{-}2}$, . . . , and $\lambda_{in\text{-}N}$).

FIG. 4C also illustrates that output waveguide 104 is coupled with a first pair of reflectors 108 (e.g., a first reflector 108A and a second reflector 108B) defining a first resonant cavity 110 in output waveguide 104. First reflector 108A and second reflector 108B are positioned non-parallel to output axis 106. Interaction regions 180 (e.g., 180-1, 180-2, 180-N) are located between the first pair of reflectors 108 and in first resonant cavity 110 (e.g., within output waveguide 104).

In some embodiments, a respective input waveguide of the plurality of input waveguides 114 (e.g., 114-1, 114-2, 114-N) is optically coupled with a respective second pair of reflectors (e.g., 118-1, 118-2, 118-N). Each second pair of reflectors 118-N includes a third reflector 118A-N and a fourth reflector 118B-N, and defines a respective second resonant cavity (e.g., 120-1, 120-2, 120-N). Each second pair of reflectors (e.g., 118-1, 118-2, 118-N) disposed non-parallel to the respective input axis (e.g., 116-1, 116-2, 116-N) (e.g., each reflector of a respective second pair of reflectors is positioned perpendicular to the respective input axis). Each second resonant cavity (e.g., 120-1, 120-2, 120-N) is configured for receiving and causing resonance of a respective input light (e.g., $\lambda_{in\text{-}1}$, $\lambda_{in\text{-}2}$, or $\lambda_{in\text{-}N}$) having an input wavelength $\lambda_{in}$ (e.g., the cavity length of each second resonant cavity 120 is an integer multiple of $(\lambda_{in}/2n)$, where n is a refractive index of material between a respective second pair of reflectors 118).

In some embodiments, first reflector 108A selectively transmits light of a first predetermined wavelength and second reflector 108B selectively transmits light of a second predetermined wavelength (i.e., reflector 108A selectively transmits $\lambda_{out1}$ and reflector 108B selectively transmits $\lambda_{out2}$).

In some embodiments, reflector 108A has a first reflectance and reflector 108B has a second reflectance distinct from the first reflectance.

In some embodiments, the plurality of input waveguides (e.g., 114-1, 114-2, 114-N) are configured to cause constructive interference between the photons emitted from the plurality of interaction regions (180-1, 180-2, . . . , 180-N). In such embodiments, the constructive interference condition leads to a probability of generating a pair of photons $P_{pair}$ in photon source device 470 that is given by the following relationship, $$P_{pair} \propto P_0^2 \frac{1}{N^2}\left[\text{sinc}\left(\frac{k_{out1}-k_{out2}}{2}w\right)\frac{\sin\left(\frac{k_{out1}-k_{out2}}{2}Na\right)}{\sin\left(\frac{k_{out1}-k_{out2}}{2}a\right)}\right]^2$$

where $P_0$ is the total power of the input light, w corresponds to a width or diameter of a respective interaction region, a corresponds to the distance between each photon source unit 401, N corresponds to the number of input waveguides (e.g., 114-1, 114-2, 114-N) for photon source device 470, and $k_{out1}$ and $k_{out2}$ are wavenumbers that correspond to wavelengths of the generated photons $\lambda_{out1}$ and $\lambda_{out2}$. Wavenumber $k_{out1}$ corresponds to wavelength $\lambda_{out1}$ and wavenumber $k_{out2}$ corresponds to wavelength $\lambda_{out2}$ by the following relation $$k = \frac{2\pi}{\lambda}.$$

In some cases, the sine cardinal function represents the effect of phase matching in a respective interaction region, and the sine function represents the effect of phase matching for multiple interaction regions (e.g., narrowing of the phase matching bandwidth).

In some embodiments, each input waveguide (e.g., 114-1, 114-2, 114-N) is coupled with only one reflector, namely a respective fourth reflector (e.g., 118B-1, 118B-2, 118B-N) of the respective second pair of reflectors (e.g., 118-1, 118-2, 118-N). For example, in some embodiments, photon source device 470 does not include one or more third reflectors (e.g., 118A-1, 118A-2, 118A-N). In some embodiments, each fourth reflector (e.g., 118B-1, 118B-2, 118B-N) is disposed non-parallel to a respective input axis (e.g., 116-1, 116-2, 116-N) (e.g., each fourth reflector is positioned perpendicular to the respective input axis).

Figure 4D:
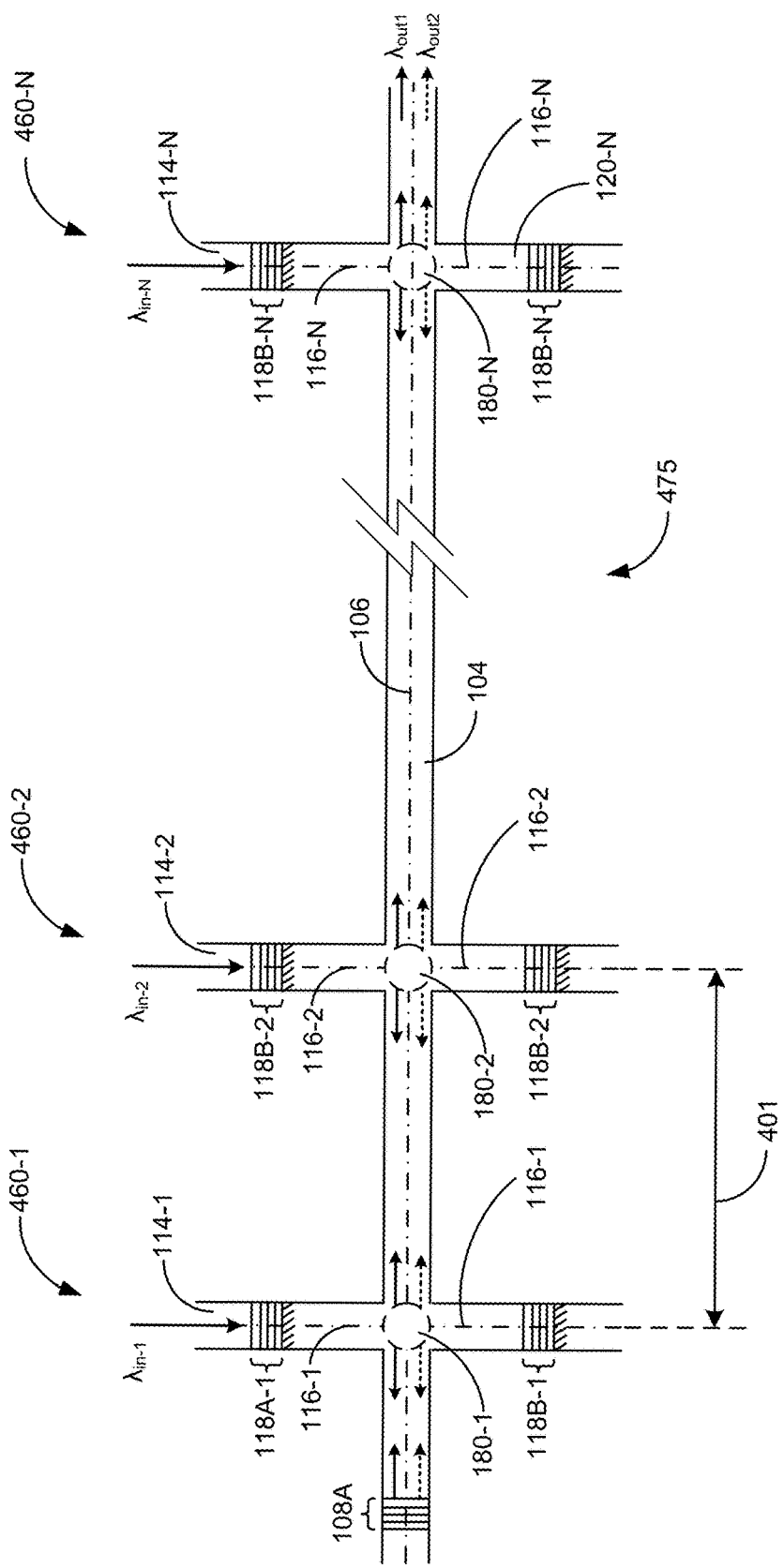
FIG. 4D illustrates an example photon source device having a plurality of waveguides in accordance with some embodiments.

FIG. 4D illustrates photon source device 475, which is similar to photon source device 470 except that photon source device 475 includes only a single reflector of the first pair of reflectors 108 (e.g., first reflector 108A or second reflector 108B) for output waveguide 104. Using only a single reflector of the first pair of reflectors 108 for output waveguide 104 enables compact photon source device 475 and reduces loss of photons associated with partial reflectors.

In some embodiments, the single reflector (either first 108A or second reflector 108B) reflects two or more predetermined wavelengths (e.g., $\lambda_{out1}$ and $\lambda_{out2}$ are both reflected by the single reflector).

Figure 4E:
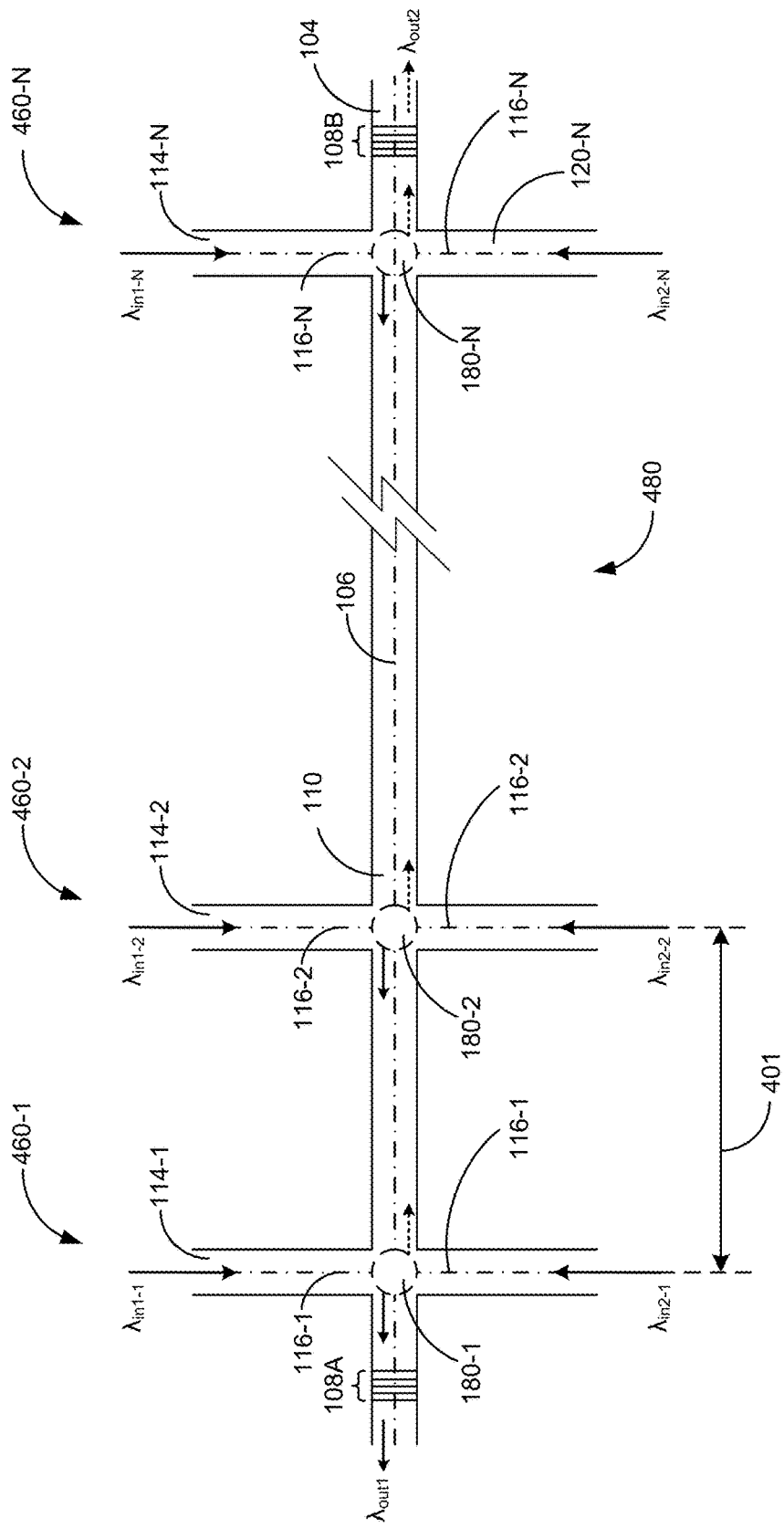
FIG. 4E illustrates an example photon source device having a plurality of waveguides in accordance with some embodiments.

FIG. 4E illustrates photon source device 480, which is similar to photon source device 470 except that a respective input waveguide (e.g., 116-N) of the plurality of input waveguides is coupled to a respective pair of input light sources (e.g., each input waveguide receives first light having wavelength $\lambda_{in1-N}$ and first light having wavelength $\lambda_{in2-N}$) that interact with a respective interaction region (e.g., 180-N).

In some embodiments, for each photon source unit, a respective first light source of a respective pair of light sources (e.g., a light source providing $\lambda_{in1-1}$, $\lambda_{in1-2}$, . . . and $\kappa_{in1-N}$) and a respective second light source of the respective pair of light sources (e.g., $\lambda_{in2-1}$, $\lambda_{in2-2}$, . . . and $\lambda_{in2-N}$) are configured to illuminate a respective interaction region (e.g., 180-1, 180-2, . . . and 180-N). In some embodiments, wavelengths $\lambda_{in1-1}$, $\lambda_{in1-2}$, and $\lambda_{in1-N}$ are identical, and wavelengths $\lambda_{in2-1}$, $\lambda_{in2-2}$, and $\lambda_{in2-N}$ are identical.

In some embodiments, output waveguide 104 is coupled with a first pair of reflectors 108 (e.g., a first reflector 108A and a second reflector 108B) defining a first resonant cavity 110 in output waveguide 104. A respective interaction region (e.g., 180-1, 180-2, 180-N) is located between the first pair of reflectors 108 and in the first resonant cavity 110 (e.g., within output waveguide 104).

Figure 4F:
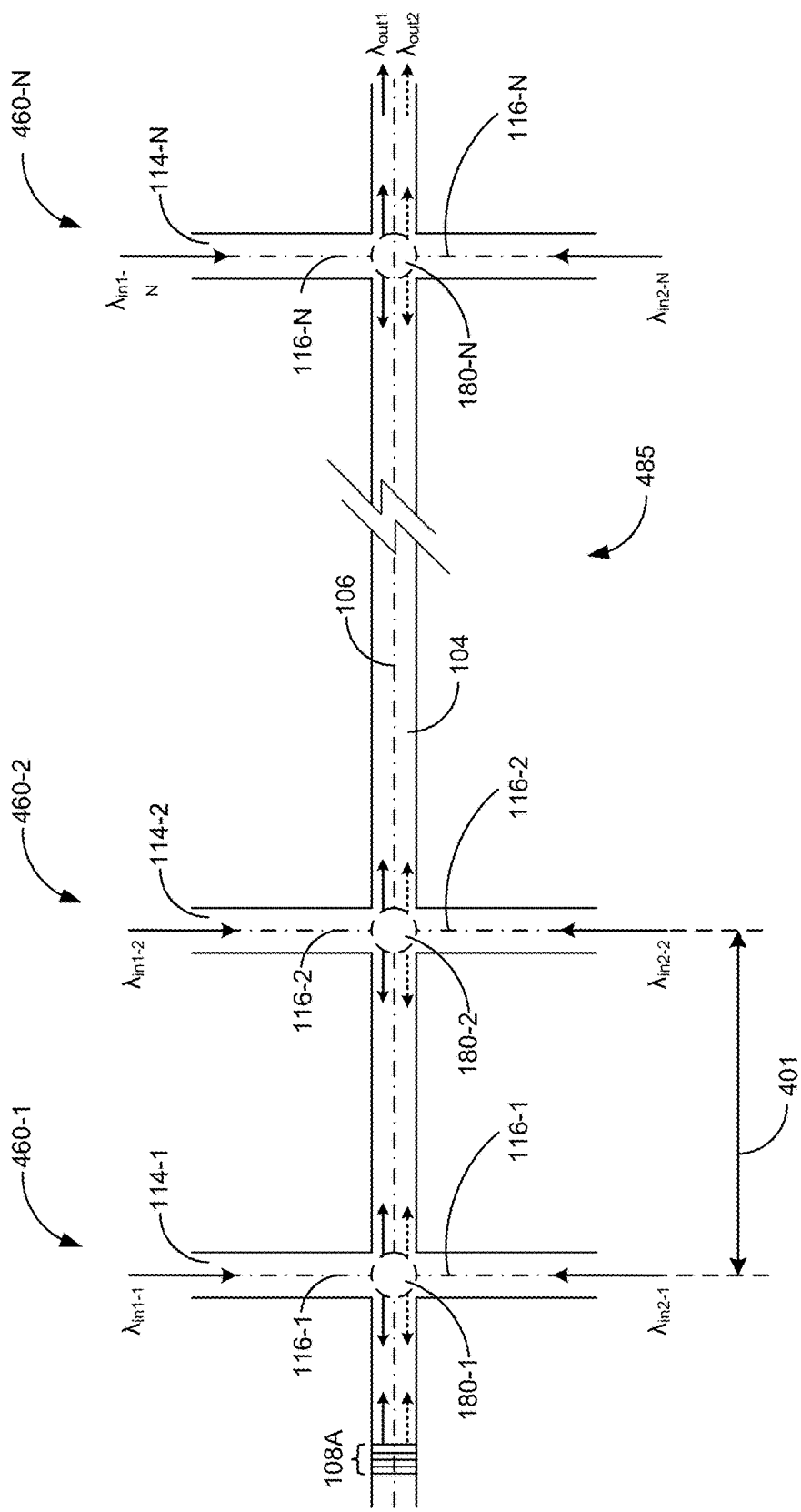
FIG. 4F illustrates an example photon source device having a plurality of waveguides in accordance with some embodiments.

FIG. 4F illustrates photon source device 485, which is similar to photon source device 480 except that photon source device 485 has only a single reflector of the first pair of reflectors 108 (e.g., first reflector 108A or second reflector 108B). For example, in FIG. 4F, photon source device 485 includes reflector 108A, but does not include reflector 108B. Using only a single reflector of the first pair of reflectors 108 for output waveguide 104 enables compact photon source device 475 and reduces loss of photons associated with partial reflectors.

In some embodiments, the single reflector (either first reflector 108A or second reflector 108B) reflects two or more predetermined wavelengths (e.g., $\lambda_{out1}$ and $\lambda_{out2}$ are both reflected by the single reflector).

Figure 5A:
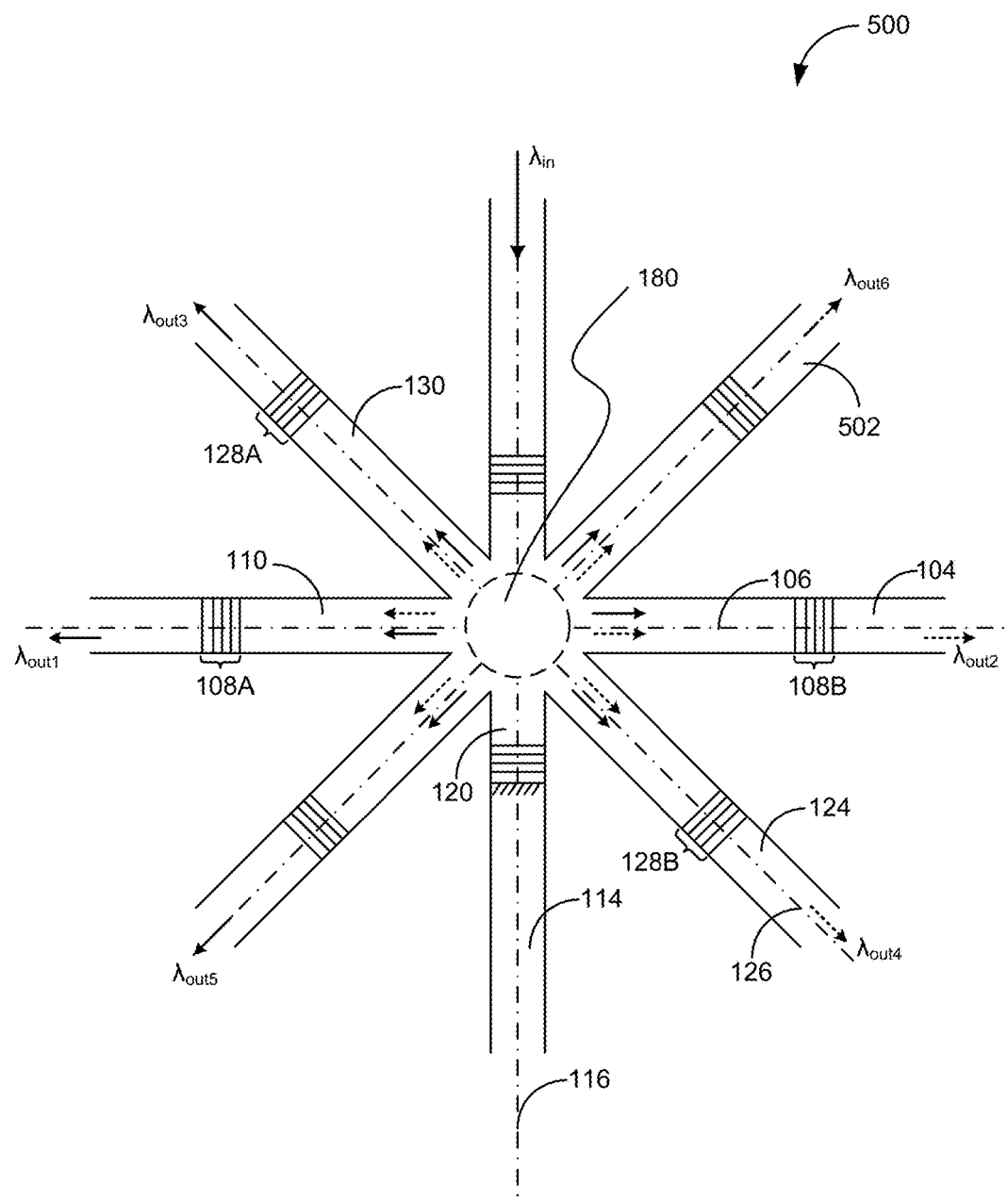
FIG. 5A illustrates an example photon source device having a plurality of waveguides that intersect at a common interaction region in accordance with some embodiments.

FIG. 5A illustrates example photon source device 500 having a plurality of waveguides that intersect at a common interaction region in accordance with some embodiments.

The plurality of waveguides of photon source device 500 includes first waveguide 104 extending along first axis 106, second waveguide 114 extending along second axis 116, third waveguide 124 extending along third axis 126, and fourth waveguide 502 extending along a fourth axis. First waveguide 104 is coupled with a first pair of reflectors 108 defining first resonant cavity 110 in first waveguide 104. Second waveguide 114 includes a second pair of reflectors 118 defining second resonant cavity 120. Second resonant cavity 120 is configured for receiving and causing resonance of a light having an input wavelength $\lambda_{in}$ (e.g., the cavity length of second resonant cavity 120 is an integer multiple of ($\lambda_{in}/2n$), where n is a refractive index of material between the second pair of reflectors 118). Third waveguide 124 is coupled with a third pair of reflectors 128 defining third resonant cavity 130 in third waveguide 104. Fourth waveguide 502 is coupled with a fourth pair of reflectors defining a fourth resonant cavity in fourth waveguide 502. First resonant cavity 110, second resonant cavity 120, third resonant cavity 130, and the fourth resonant cavity intersect one another at common interaction region 180.

In some embodiments, first resonant cavity 110 is configured for a signal photon of a first output wavelength $\lambda_{out1}$ (in vacuum) that is distinct from the input wavelength and an idler photon of a second output wavelength $\lambda_{out2}$ (in vacuum) that is distinct from the input wavelength (e.g., the first pair of reflectors 108 are positioned at locations corresponding to a cavity length that is an integer multiple of $\lambda_{out1}/n$ and $\lambda_{out2}/n$, where n is a refractive index of the material filling first resonant cavity 110). In some embodiments, third resonant cavity 130 is configured for a signal photon of a third output wavelength $\lambda_{out3}$ that is distinct from the input wavelength and an idler photon of a fourth output wavelength $\lambda_{out4}$ that is distinct from the input wavelength $\lambda_{in}$ (e.g., the third pair of reflectors 128 are positioned at locations corresponding to a cavity length that is an integer multiple of $\lambda_{out3}/n$ and an integer multiple of $\lambda_{out4}/n$, where n is a refractive index of the material filling third resonant cavity 130). In some embodiments, the fourth output cavity is configured for a signal photon of a fifth output wavelength Routs that is distinct from the input wavelength and an idler photon of a sixth output wavelength $\lambda_{out6}$ that is distinct from the input wavelength (e.g., the fourth pair of reflectors are positioned at locations corresponding to a cavity length that is an integer multiple of $\lambda_{out5}/n$ and an integer multiple of $\lambda_{out6}/n$, where n is a refractive index of the material filling the fourth resonant cavity).

In some embodiments, the first output wavelength, the second output wavelength, the third output wavelength, the fourth output wavelength, the fifth output wavelength, and the sixth output wavelength are all distinct from one another. In some embodiments, the first output wavelength corresponds to the third output wavelength. In some embodiments, the first output wavelength corresponds to the fifth output wavelength. In some embodiments, the third output wavelength corresponds to the fifth output wavelength. In some embodiments, the first output wavelength is distinct from the third output wavelength and the fourth output wavelength. In some embodiments, the first output wavelength is distinct from the fifth output wavelength and the sixth output wavelength.

Interaction region 180 is located on a path of input light of the input wavelength $\lambda_{in}$ traveling in second resonant cavity 120. The input light of the input wavelength $\lambda_{in}$ interacts with a non-respective linear optical medium in interaction region 180, and creates output photons (e.g., a signal photon sA of the first output wavelength $\lambda_{out1}$ and an idler photon iA of the second output wavelength $\lambda_{out2}$, a signal photon of the third output wavelength $\lambda_{out3}$ and an idler photon of the fourth output wavelength $\lambda_{out4}$, and/or a signal photon of the fifth output wavelength $\lambda_{out5}$ and an idler photon of the sixth output wavelength $\lambda_{out6}$).

In some embodiments, as shown in FIG. 5A, first waveguide 104 is configured to emit the signal photon sA from one end of first waveguide 104 (e.g., a first end of first waveguide 104 proximate to reflector 108A) and emit the idler photon iA from the other end of first waveguide 104 (e.g., a second end of first waveguide 104 proximate to reflector 108B). In some embodiments, first waveguide 104 is configured to emit both the signal photon sA and the idler photon iA from one end of first waveguide 104 (e.g., the first end of first waveguide 104 proximate to reflector 108A), and optionally, emit no photon from the other end of first waveguide 104 (e.g., the second end of first waveguide 104 proximate to reflector 108B).

In some embodiments, as shown in FIG. 5A, third waveguide 130 is configured to emit the signal photon of the third output wavelength $\lambda_{out3}$ from one end of third waveguide 130 (e.g., a first end of third waveguide 130 proximate to reflector 128A) and emit the idler photon of the fourth output wavelength $\lambda_{out4}$ from the other end of third waveguide 130 (e.g., a second end of third waveguide 130 proximate to reflector 128B). In some embodiments, third waveguide 130 is configured to emit both the signal photon of the third output wavelength $\lambda_{out3}$ and the idler photon of the fourth output wavelength $\lambda_{out4}$ from one end of third waveguide 130 (e.g., the first end of third waveguide 130 proximate to reflector 128A), and optionally, emit no photon from the other end of third waveguide 130 (e.g., the second end of third waveguide 130 proximate to reflector 128B).

In some embodiments, as shown in FIG. 5A, the fourth waveguide is configured to emit the signal photon of a fifth output wavelength $\lambda_{out5}$ from one end of the fourth waveguide (e.g., a first end of the fourth waveguide) and emit the idler photon of a sixth output wavelength $\lambda_{out6}$ from the other end of the fourth waveguide (e.g., a second end of the fourth waveguide opposite to the first end of the fourth waveguide). In some embodiments, the fourth waveguide is configured to emit both the signal photon of the fifth output wavelength Routs and the idler photon of the sixth output wavelength $\lambda_{out6}$ from one end of the fourth waveguide (e.g., the first end of the fourth waveguide), and optionally, emit no photon from the other end of the fourth waveguide (e.g., the second end of the fourth waveguide).

Although FIG. 5A illustrates a photon source device with a single input waveguide and three output waveguides intersecting at a common interaction region, a photon source device may be configured with fewer (e.g., two) or more (e.g., four, five, six, etc.) output waveguides. For brevity, such details are not repeated herein.

Figure 5B:
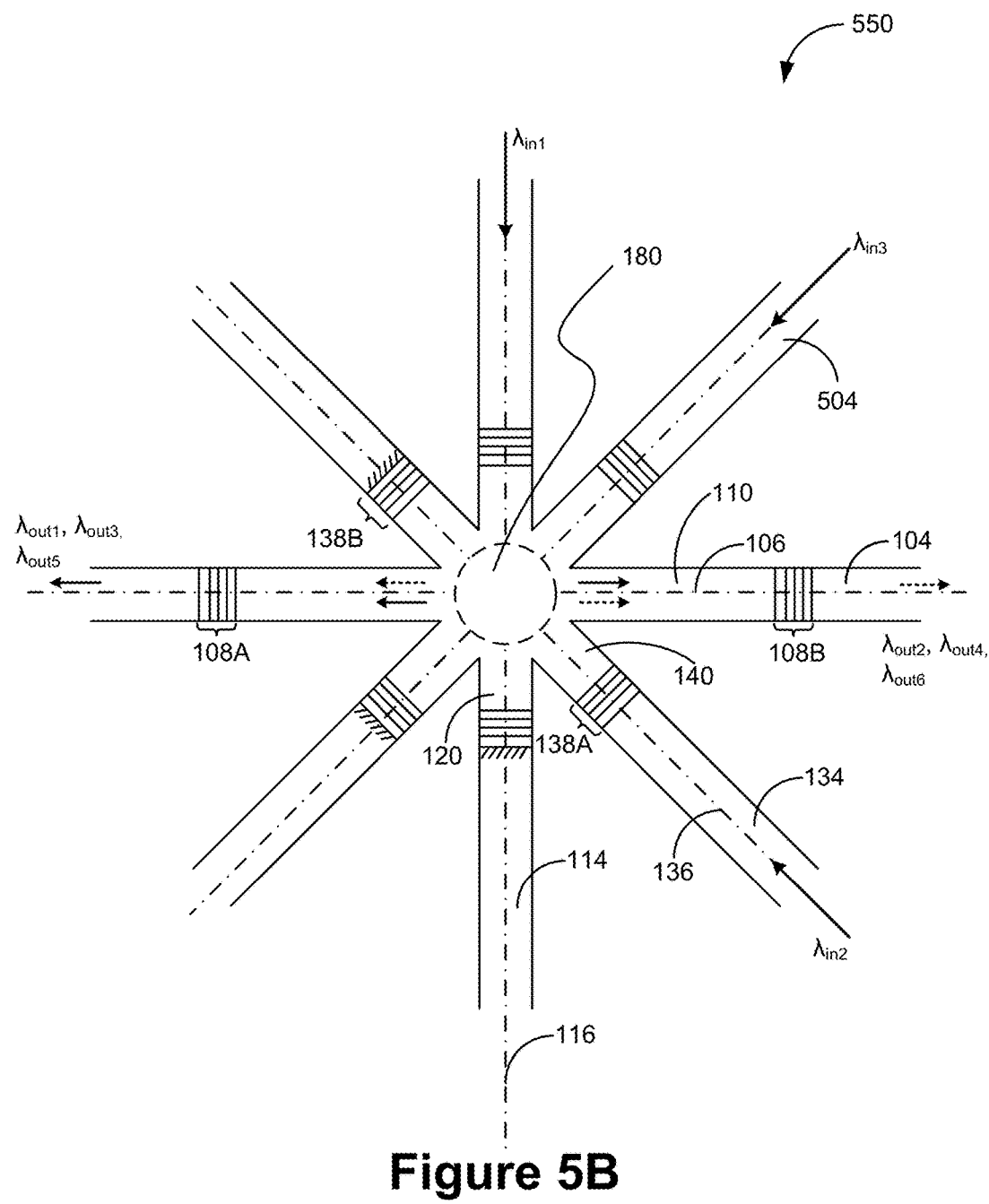
FIG. 5B illustrates an example photon source device having a plurality of waveguides that intersect at a common interaction region in accordance with some embodiments.

FIG. 5B illustrates example photon source device 550 having a plurality of waveguides that intersect at a common interaction region in accordance with some embodiments.

The plurality of waveguides of photon source device 550 include first waveguide 104 extending along first axis 106, second waveguide 114 extending along second axis 116, third waveguide 134 extending along third axis 136, and fourth waveguide 504 extending along a fourth axis. First waveguide 104 is coupled with a first pair of reflectors 108 defining first resonance cavity 110 in first waveguide 104. Second waveguide 114 includes a second pair of reflectors defining second resonant cavity 120. Second resonant cavity 120 is configured for receiving and causing resonance of input light of a first input wavelength $\lambda_{in1}$. Third waveguide 134 includes a third pair of reflectors 138 defining third resonant cavity 140. Third resonant cavity 140 is configured for receiving and causing resonance of input light of a second input wavelength $\lambda_{in1}$. Fourth waveguide 504 includes a fourth pair of reflectors defining a fourth resonant cavity. The fourth resonant cavity is configured for receiving and causing resonance of input light of a third input wavelength $\lambda_{in3}$.

In some embodiments, the first input wavelength, the second input wavelength, and the third input wavelength are all distinct. In some embodiments, the first input wavelength is distinct from the second input wavelength. In some embodiments, the first input wavelength is distinct from the third input wavelength. In some embodiments, the second input wavelength is distinct from the third input wavelength. In some embodiments, the first input wavelength, the second input wavelength, and the third input wavelength are identical.

The input light of the first input wavelength initiates generation of a signal photon of a first output wavelength $\lambda_{out1}$ and an idler photon of a second output wavelength $\lambda_{out2}$ in interaction region 180. The input light of the second input wavelength initiates generation of a signal photon of a third output wavelength $\lambda_{out3}$ and an idler photon of a fourth output wavelength $\lambda_{out4}$ in interaction region 180. The input light of the third input wavelength initiates generation of a signal photon of a fifth output wavelength $\lambda_{out5}$ and an idler photon of a sixth output wavelength $\lambda_{out6}$ in interaction region 180. In some embodiments, the first output wavelength and the second output wavelength are distinct from the third output wavelength and the fourth output wavelength. In some embodiments, the first output wavelength and the second output wavelength are distinct from the fifth output wavelength and the sixth output wavelength. In some embodiments, the third output wavelength and the fourth output wavelength are distinct from the fifth output wavelength and the sixth output wavelength.

Although FIG. 5B illustrates a photon source device with three input waveguides and a single output waveguide intersecting at a common interaction region, in some embodiments, a photon source device includes fewer (e.g., two) or more (e.g., four, five, six, etc.) input waveguides. In addition, in some embodiments, a photon source device includes multiple input waveguides and multiple output waveguides intersection one another at a common interaction region (e.g., two input waveguides and two output waveguides intersecting at a common interaction region). For brevity, such details are not repeated herein.

Figure 6:
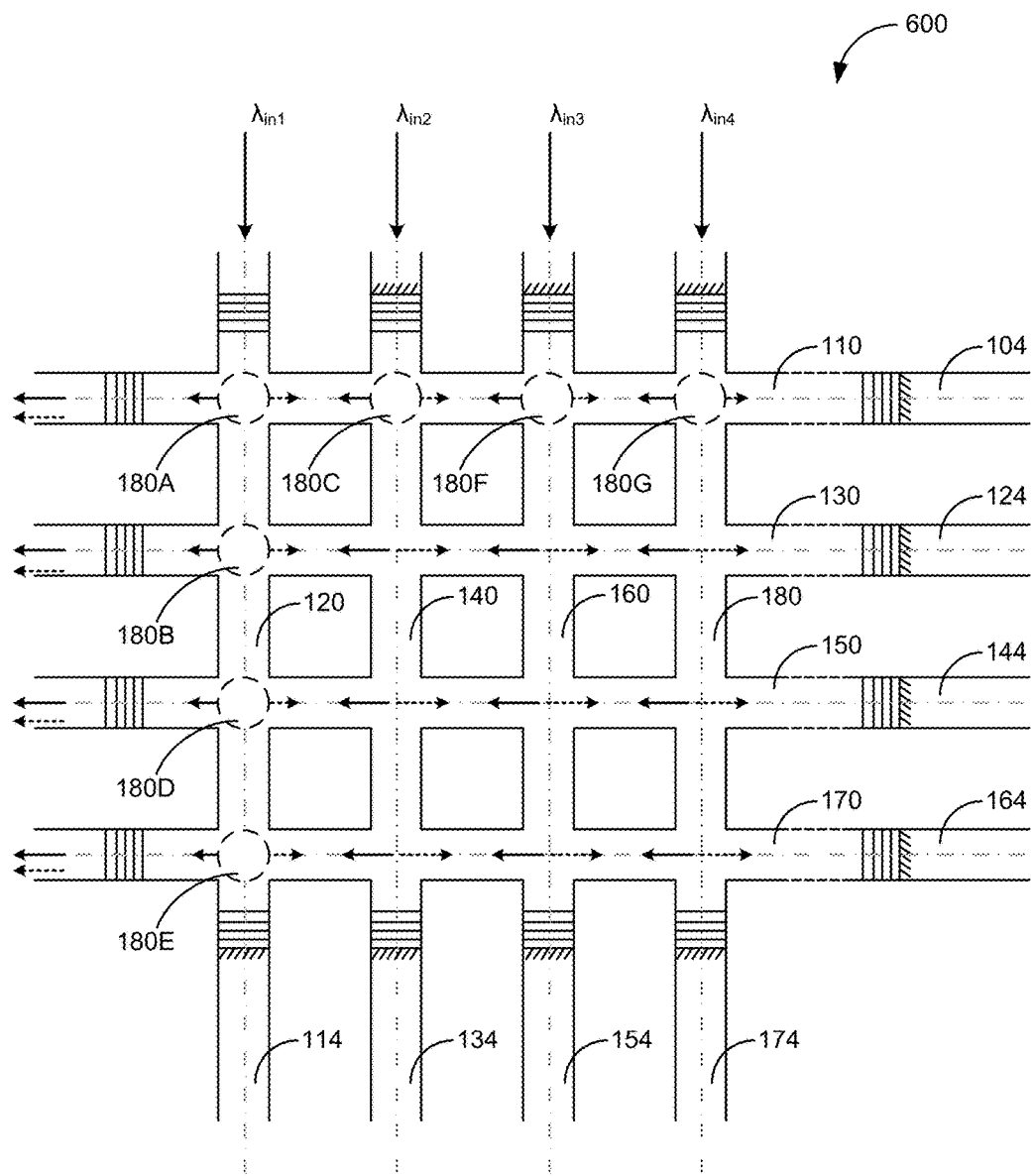
FIG. 6 illustrates an example photon source device having a plurality of waveguides in accordance with some embodiments.

FIG. 6 illustrates a photon source device 600 having a plurality of waveguides in accordance with some embodiments. The plurality of waveguides includes a first waveguide 104, second waveguide 114 and multiple additional waveguides (e.g., third waveguide 124, fourth waveguide 134, fifth waveguide 144, sixth waveguide 154, seventh waveguide 164 and eighth waveguide 174). The plurality of waveguides is arranged on substrate 102. A plurality of reflectors is coupled with the plurality of waveguides. Each waveguide extends along a respective axis and is coupled with a pair of reflectors defining a respective resonant cavity. In some embodiments, the pair of reflectors are disposed substantially in parallel to each other.

The plurality of waveguides includes a first subset of waveguides and a second subset of waveguides. In some embodiments, the axes along which the first subset of waveguides extend are substantially parallel to one another, and the axes along which the second subset of waveguides extend are substantially parallel to one another but not parallel to the axes along which the first subset of waveguides extend.

In some embodiments, each of the first subset of waveguides intersects with each and every waveguide of the second subset of waveguides, while not intersecting with any other waveguide in the first subset of waveguides. For example, in some implementations, the first subset of waveguides includes first waveguide 104, third waveguide 124, fifth waveguide 144 and seventh waveguide 164; and the second subset of waveguides includes second waveguide 114, fourth waveguide 134, sixth waveguide 154 and eighth waveguide 174. For example, first waveguide 104 intersects with waveguides 114, 134, 154 and 174, but not with waveguides 124, 144 and 164. As such, each waveguide of the second subset of the waveguides includes a plurality of respective interaction regions 180 in a respective resonant cavity, and each waveguide of the first subset of the waveguides also includes a plurality of respective interaction regions 180 in a respective resonant cavity.

In some embodiments, each of the second set of waveguides is configured to receive input light of a respective input wavelength $\lambda_{in}$ through a respective first reflector of a respective pair of reflectors. In some embodiments, each of interaction regions 180 located in the respective resonant cavity is at least partially filled with a respective non-linear optical medium that initiates an optical conversion of the input light. For example, second waveguide 114 includes four interaction regions 180A, 180B, 180D and 180E filled with non-linear optical media. Photons received in second waveguide 114 travel through four interaction regions 180A, 180B, 180D, and 180E in a single pass through a resonant cavity defined in second waveguide 114, thereby increasing the yield of photons that are generated from a same input light.

In some embodiments, each waveguide of the first set of waveguides outputs photons of two or more respective output wavelengths. In some embodiments, for each waveguide of the first set of waveguides, each interaction region of interaction regions 180 located in the respective resonant cavity is at least partially filled with a respective non-linear optical medium that initiates an optical conversion of the input light. For example, first waveguide 104 includes four interaction regions 180A, 180C, 180F and 180G filled with non-linear optical media. Photons generated in four interaction regions 180A, 180C, 180F and 180G are outputted via first waveguide 104, thereby increasing the yield of photons that can be outputted via a single waveguide.

The first subset of waveguides has a first number of waveguides, and the second subset of waveguides has a second number of waveguides. The first number is optionally equal to, greater than, or less than the second number. In some embodiments, locations of the reflectors in each of the second set of waveguides are determined based on the respective input wavelength $\lambda_{in}$ to facilitate the resonance of light having the respective input wavelength in the respective resonant cavity. The locations of the reflectors can be identical or distinct in any two waveguides of the second set of waveguides. Further, in some embodiments, locations of the reflectors in each of the first set of waveguides are determined according to respective output wavelengths for the respective waveguide of the first set of waveguides to facilitate the resonance of light having the respective output wavelengths in the respective resonant cavity. The locations of the reflectors can be identical or distinct in any two of the first set of waveguides. Thus, each of the resonant cavities for the plurality of waveguides of photon source device 600 can be engineered independently, thereby allowing flexible selection of output wavelengths and conversion efficiencies for the single photon source.

Figure 7A:
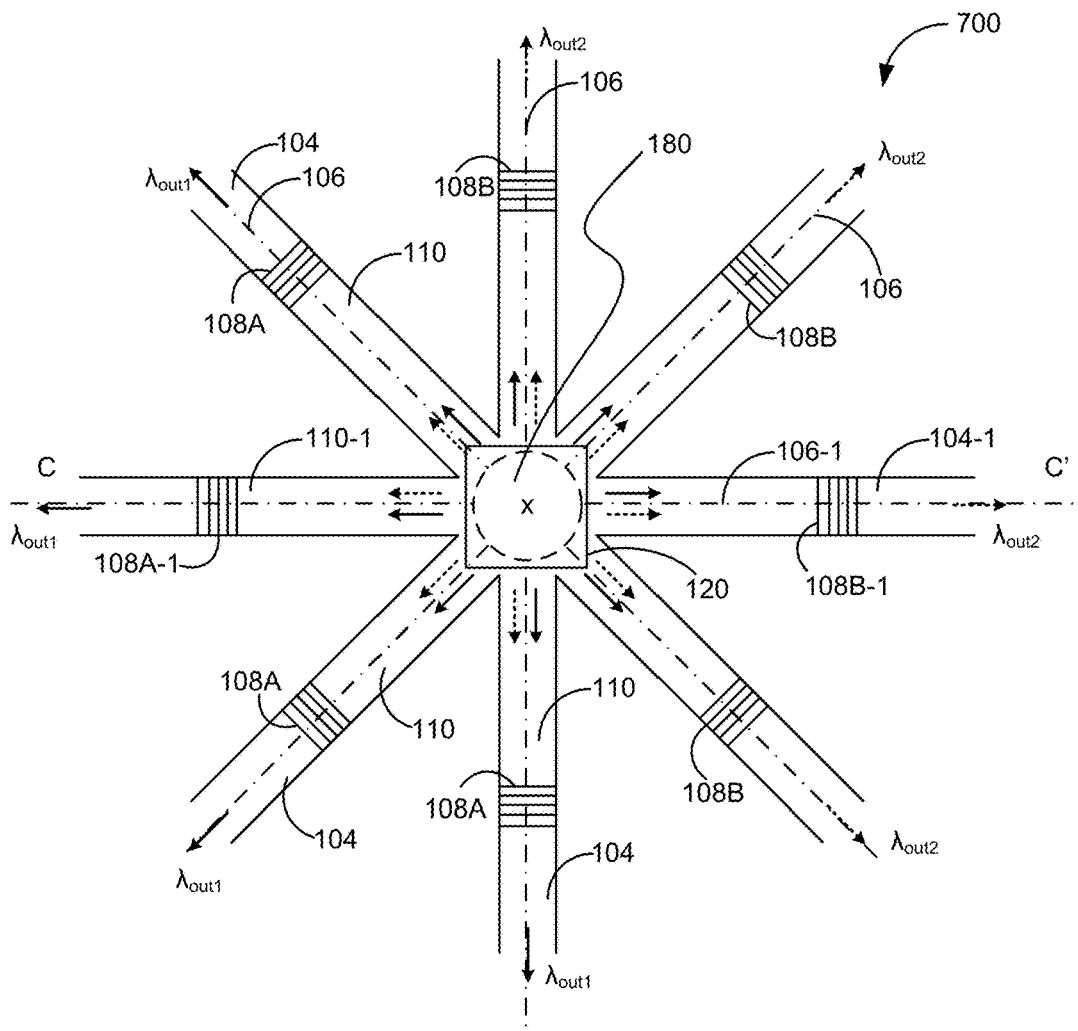
FIG. 7A is a top view of an example photon source device having a plurality of waveguides that intersect one another and receive input light at a common interaction region in accordance with some embodiments.
Figure 7B:
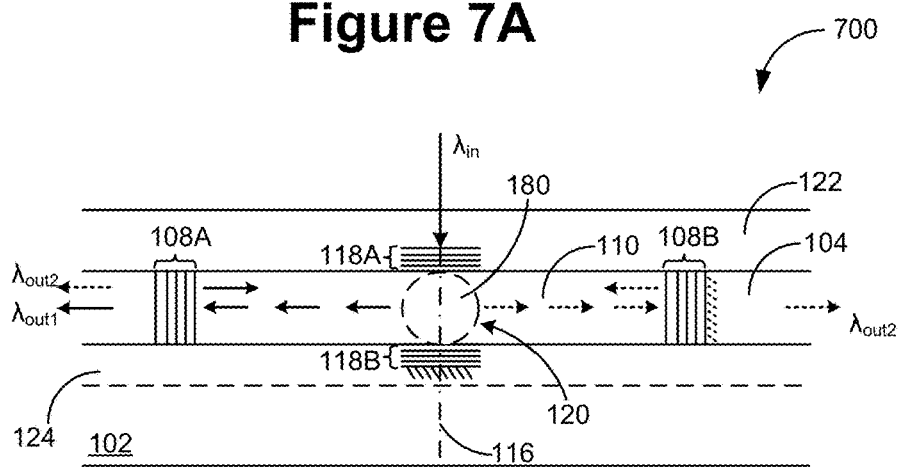
FIG. 7B is a cross-sectional view of the photon source device shown in FIG. 7A in accordance with some embodiments.

FIG. 7A is a top view of example photon source device 700 having a plurality of waveguides that intersect one another and receive input light at a common interaction region in accordance with some embodiments, and FIG. 7B is a cross-sectional view of photon source device 700 shown in FIG. 7A in accordance with some embodiments. Line CC' in FIG. 7A represents a view from which the cross-section shown in FIG. 7B is taken.

Photon source device 700 includes substrate 102 and a plurality of first waveguides 104 arranged on substrate 102. Each of the plurality of first waveguides 104 extends along a respective first axis 106, and is coupled with a first pair of reflectors 108 defining first resonant cavity 110 in the respective first waveguide 104. Specifically, first waveguide 104-1 extends along first axis 106-1 (along line CC') and is coupled with a first pair of reflectors 108A-1 and 108B-1 defining first resonant cavity 110-1 in first waveguide 104-1. For each of the plurality of first waveguides 104, first resonant cavity 110 is configured for outputting a first output wavelength $\lambda_{out1}$ and a second output wavelength $\lambda_{out2}$. The first pair of reflectors 108 includes a partial reflector for the first output wavelength $\lambda_{out1}$ and a partial reflector for the second output wavelength $\lambda_{out2}$.

The plurality of first waveguides 104 intersect with each other at common interaction region 180. First axes 106 of the plurality of first waveguides 104 are substantially parallel to a planar surface of substrate 102, and intersect with each other in common interaction region 180.

A second pair of reflectors 118 is disposed above and below interaction region 180, and defines second resonant cavity 120 extending along second axis 116 that is non-parallel to first axis 106. Second resonant cavity 120 intersects with first resonant cavity 110 at interaction region 180, and second resonant cavity 120 is configured for an input wavelength $\lambda_{in}$ that is distinct from the first output wavelength $\lambda_{out1}$ and the second output wavelength $\lambda_{out2}$. First reflector 118A of the second pair of reflectors 118 has a first reflectance for the input wavelength $\lambda_{in}$, and a second reflector 118B of the second pair of reflectors 118 has a second reflectance for the input wavelength $\lambda_{in}$.

An input light of the input wavelength $\lambda_{in}$ enters interaction region 180 along a direction that is not parallel to the planar surface of the substrate (e.g., the direction is substantially perpendicular to the planar surface of the substrate). In some embodiments, the direction of the input light follows second axis 116 or is substantially parallel to second axis 116. Referring to FIG. 7A, in some embodiments, the direction of the input light intersects with each of the first axes 106 at an angle that is substantially equal to 90 degrees. It is noted that in some implementations, the direction of the input light intersects with one or more of first axes 106 at an angle that is not equal to 90 degrees. In some embodiments, the input light is converted to photons of a plurality of output wavelengths that spread along the first plurality of waveguides 104 arranged in substrate 102. In some cases, this results in a compact form factor and efficient separation of photons in photon source device 700.

Although FIGS. 7A and 7B illustrate photon source device 700 with a plurality of first waveguides 104 each coupled with a first pair of reflectors 108, in some embodiments, photon source device 700 includes a plurality of waveguides intersecting at a common interaction region, including: a first set of waveguides each coupled with a pair of reflectors for a first output wavelength and a second output wavelength that is distinct from the first output wavelength, and a second set of waveguides each coupled with a pair of reflectors for a third output wavelength that is distinct from the first output wavelength and the second output wavelength and a fourth output wavelength that is distinct from the first output wavelength, the second output wavelength, and the third output wavelength. In some embodiments, a photon source device includes a plurality of waveguides intersecting at a common interaction region, each waveguide coupled with a pair of reflectors for a distinct pair of output wavelengths.

FIGS. 9A-9D are planar cross-sectional views of photon source devices 900 with a ring resonator cavity in accordance with some embodiments.

Figure 9A:
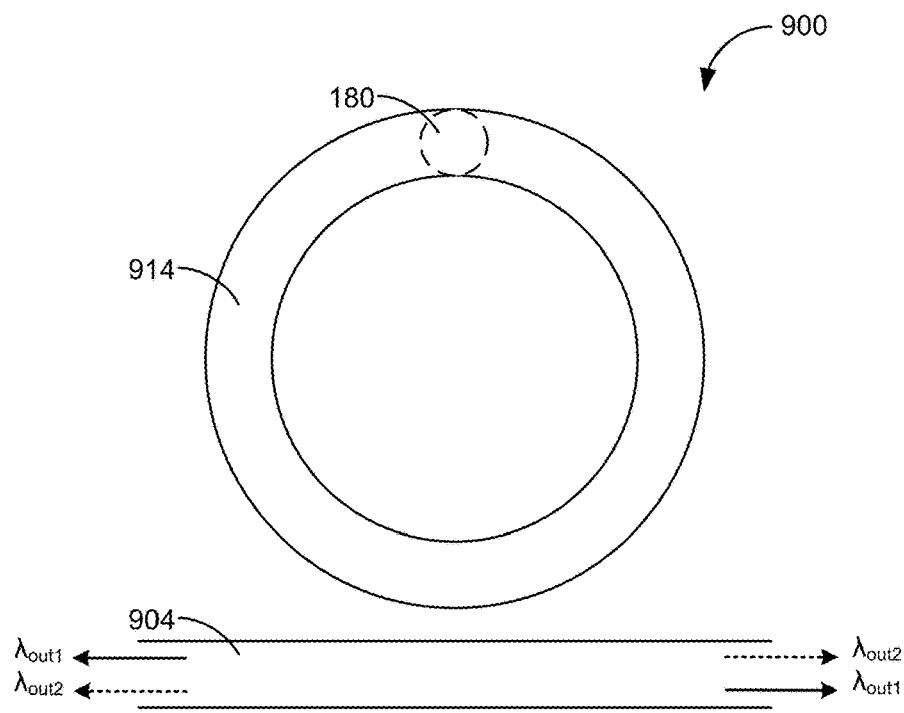
FIG. 9A illustrates an example photon source device with a ring resonator cavity in accordance with some embodiments.

FIG. 9A illustrates photon source device 900 with a ring resonator cavity in accordance with some embodiments.

In FIG. 9A, photon source device 900 includes first waveguide 904 and second waveguide 914. As shown in FIG. 9A, second wave 914 forms a ring resonator cavity. In some embodiments, both first waveguide 904 and second waveguide 914 are arranged on a common substrate.

First waveguide 904 is configured to transmit a photon having a first output wavelength (e.g., $\lambda_{out1}$) and a photon having a second output wavelength (e.g., $\lambda_{out2}$).

Second waveguide 914 is configured to operate as an optical ring resonator and to resonate with an input light having an input wavelength. For example, an optical path length difference of second waveguide 914 is an integer multiple of the input wavelength (e.g., an optical path length difference that corresponds to $2\pi rn$ equals $m \cdot \lambda_{in}$, where r is a radius of the optical ring resonator, n is a refractive index of the material constituting the optical ring resonator, and m is an integer).

In FIG. 9A, first waveguide 904 is physically separated from second waveguide 914 (e.g., first waveguide 904 does not intersect with second waveguide 914). However, first waveguide 904 is located in proximity to second waveguide 914 so that first waveguide 904 and second waveguide 914 are optically coupled with each other (e.g., second waveguide 914 is optically coupled with first waveguide 904 to transfer a photon having a first output wavelength and a photon having a second output wavelength from second waveguide 914 to first waveguide 904).

Interaction region 180, when illuminated with an input light of an input wavelength $\lambda_{in}$ (e.g., from a direction that is not parallel to the substrate, such as a direction that is perpendicular to the substrate), generates photons having wavelengths that are distinct from the input wavelength $\lambda_{in}$. The generated photons travel along second waveguide 914 until they are transferred to first waveguide 904 through optical coupling between the two waveguides.

In some embodiments, interaction region 180 corresponds to the entire second waveguide 914. In some embodiments, interaction region 180 corresponds to one or more portions, less than all, of second waveguide 914.

In some embodiments, photon source device 900 includes one or more light sources. A respective light source of the one or more light sources configured to illuminate a respective portion of the second waveguide 914.

Figure 9B:
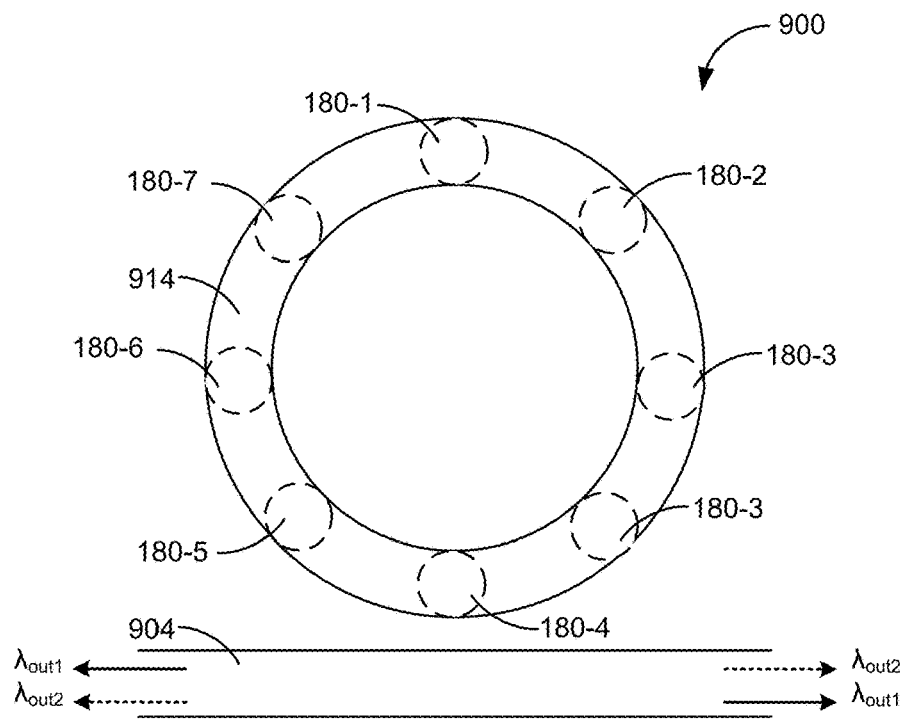
FIG. 9B is an example photon source device with a ring resonator cavity and a plurality of input light sources in accordance with some embodiments.

FIG. 9B illustrates that second waveguide 914 of photon source device 900 is illuminated at multiple locations that correspond to multiple interaction regions 180 (e.g., 180-1 through 180-7). In some embodiments, respective interaction regions 180 are illuminated from a direction that is not parallel to the substrate (e.g., a direction that is perpendicular to the substrate). In some embodiments, multiple interaction regions 180 are illuminated with light from respective light sources (e.g., interaction region 180-1 is illuminated with light from a first light source and interaction region 180-2 is illuminated with light from a second light source that is distinct from the first light source). In some embodiments, two or more interaction regions of multiple interaction regions 180 are illuminated with light from a single light source. In some embodiments, multiple interaction regions 180 are illuminated with light from a single light source.

In some embodiments, photon source device 900 includes one or more light sources configured to illuminate a plurality of distinct and separate portions of second waveguide 914. In some embodiments, the plurality of distinct and separate portions of second waveguide 914 is arranged to cause constructive interference of the input light of the input wavelength.

Although FIG. 9B shows seven interaction regions, in some embodiments, second waveguide 914 may receive input light from any number of sources of input light at a corresponding number of interaction regions.

Figure 9C:
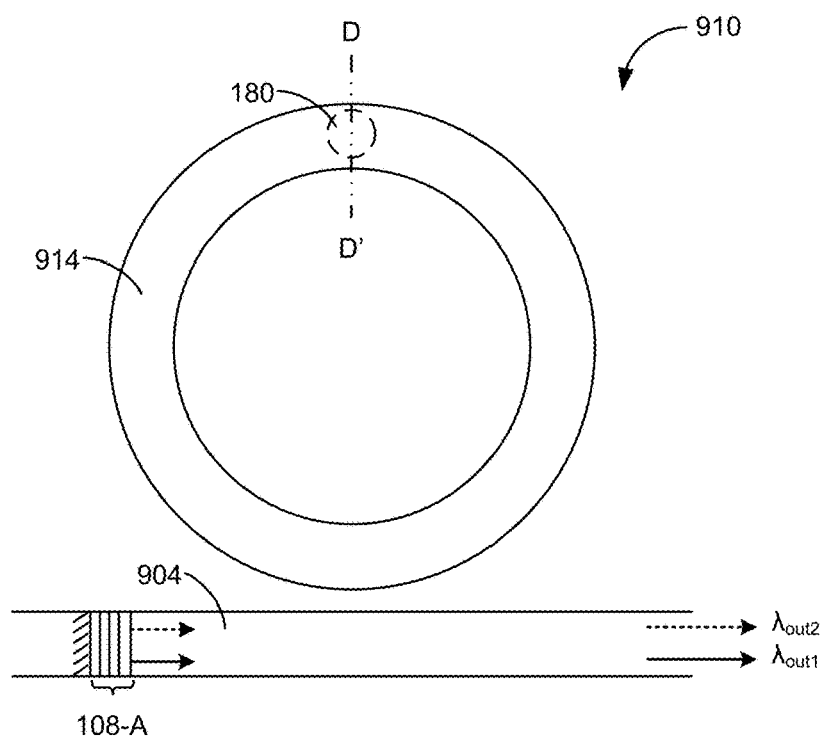
FIG. 9C is an example photon source device with a ring resonator cavity and a reflector in the output waveguide in accordance with some embodiments.
Figure 9D:
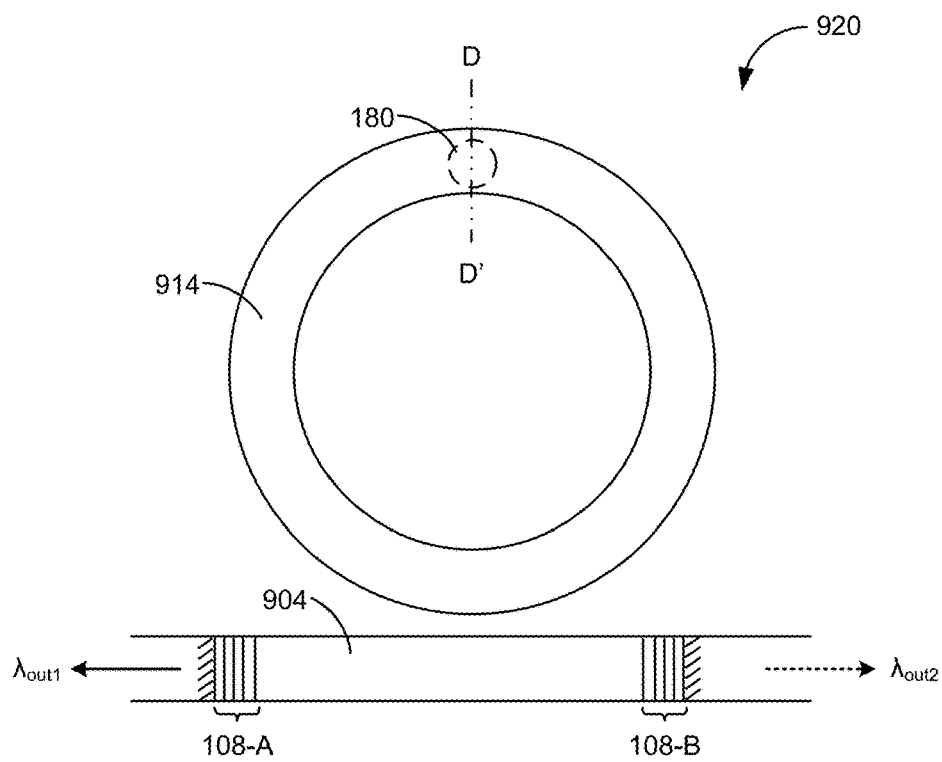
FIG. 9D is an example photon source device with a ring resonator cavity and a pair of reflectors in the output waveguide in accordance with some embodiments.

In some embodiments, one or more reflectors are optically coupled with the first waveguide. The one or more reflectors are configured to reflect light so that light that has been transmitted through the first waveguide is reflected back toward the first waveguide. For example, FIG. 9C illustrates photon source device 910, which is similar to photon source device 900 except that first waveguide 904 of photon source device 910 is optically coupled with one reflector (e.g., reflector 108-A) that reflects both light having wavelength $\lambda_{out1}$ and light having wavelength $\lambda_{out2}$. In comparison, first waveguide 904 of photon source device 900 includes neither reflector 108-A nor reflector 108-B. In another example, FIG. 9D illustrates photon source device 920, which is similar to photon source device 910 except that first waveguide 904 of photon source device 920 is optically coupled with two reflectors (e.g., reflector 108-A and reflector 108-B). Reflector 108-A transmits light having wavelength $\lambda_{out1}$ and reflect light having wavelength $\lambda_{out2}$. Reflector 108-B transmits light having wavelength $\lambda_{out2}$ and reflect light having wavelength $\lambda_{out1}$.

In some embodiments, the second waveguide defines a first plane, and a respective reflector of the one or more reflectors is positioned substantially perpendicular to the first plane.

Although FIGS. 9A and 9B show interaction regions that match the size of the waveguide, in some embodiments, the input light can over-fill or under-fill the waveguide. For example, FIGS. 9C and 9D show interaction regions that are smaller than the width of the waveguide (e.g., the diameter of an interaction region is less than the width of the waveguide).

Figure 9E:
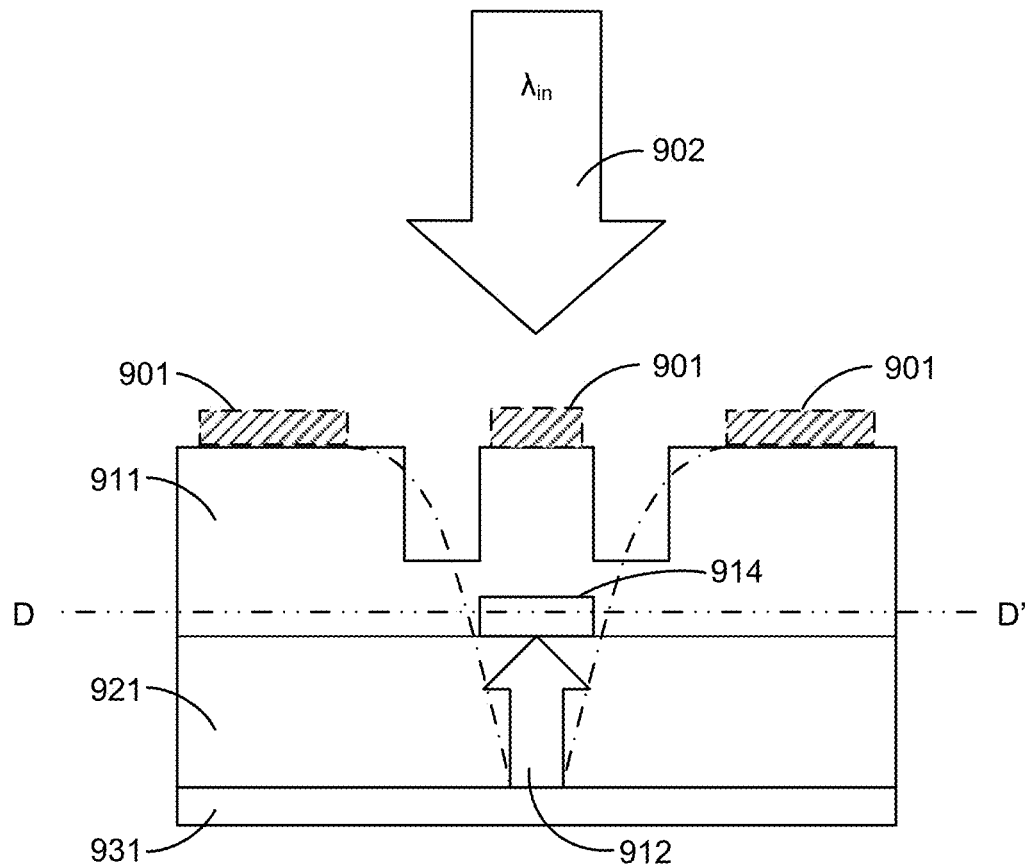
FIG. 9E is a cross-sectional view of the photon source device shown in FIGS. 9C and 9D in accordance with some embodiments.

Although FIG. 9A-9D show circular interaction regions (e.g., 180-1, 180-2, 180-3 . . . 180-N) corresponding to input light with a circular intensity profile, in some embodiments, first waveguide 904 is configured with interaction regions that correspond to input light with intensity profile(s) that are not limited to a circular intensity profile (e.g., a reflector, such as reflector 931 described with respect to FIG. 9E, may have a circular shape for reflecting input light with a circular intensity profile or have any other shape for reflecting input light with a non-circular intensity profile, such as a rectangular profile or a linear profile).

FIG. 9E is a cross-sectional view of the photon source devices shown in FIGS. 9C and 9D in accordance with some embodiments. Line D-D' in FIGS. 9C and 9D represents a view from which the cross section shown in FIG. 9E is taken. Line D-D' in FIG. 9E represents a view from which the cross sectional views illustrated in FIGS. 9C and 9D are taken. In some embodiments, photon source devices shown in FIGS. 9A and 9B have cross-sections that are analogous to the cross-sectional view shown in FIG. 9E.

As shown in FIG. 9E, in some embodiments, a photon source device (e.g., a photon source device 900, 910, and 920) includes reflector 931. In some embodiments, reflector 931 is located below second waveguide 914 so that input light 902, after passing through second waveguide 914, is reflected back toward second waveguide 914. This increases the probability of generating output photons. In some embodiments, the photon source device includes cladding material 911 (e.g., silicon oxide) and substrate 921 (e.g., buried oxide) on top of back-reflector 931 (e.g., gold mirror), and second waveguide 914 is arranged on top of substrate 921 and is surrounded on the sides and the top by cladding material 911.

In some embodiments, the photon source device includes one or more pulse shaping optical components 901 for a respective light source. In some embodiments, the pulse shaping optical components 901 are deposited on top of cladding material 911. In some embodiments, the pulse shaping optical components 901 include a metallic layer. Pulse shaping components include a central region and an annulus region positioned around the central region. In some embodiments, the central region has a first index of refraction and the annulus having a second index of refraction distinct from the first index of refraction. While shown here in cross-section, the optical components 901 and/or the trench formed in the cladding material 911 can be circularly symmetric, e.g., so as to overlap with and couple light into the interaction regions, e.g., region 180. In some embodiments the pulse shaping optical components could be of any form, e.g., they could be a diffractive optic, a Fresnel lens, a distributed Bragg reflector, a microlens, and the like. While thin film structures are shown in FIG. 9E, any type of structure can be used without departing from the scope of the present disclosure.

It should be noted that details of photon source devices described with respect to FIGS. 1A-9E are also applicable in an analogous manner to any other photon source devices described with respect to FIGS. 1A-9E.

Figure 8:
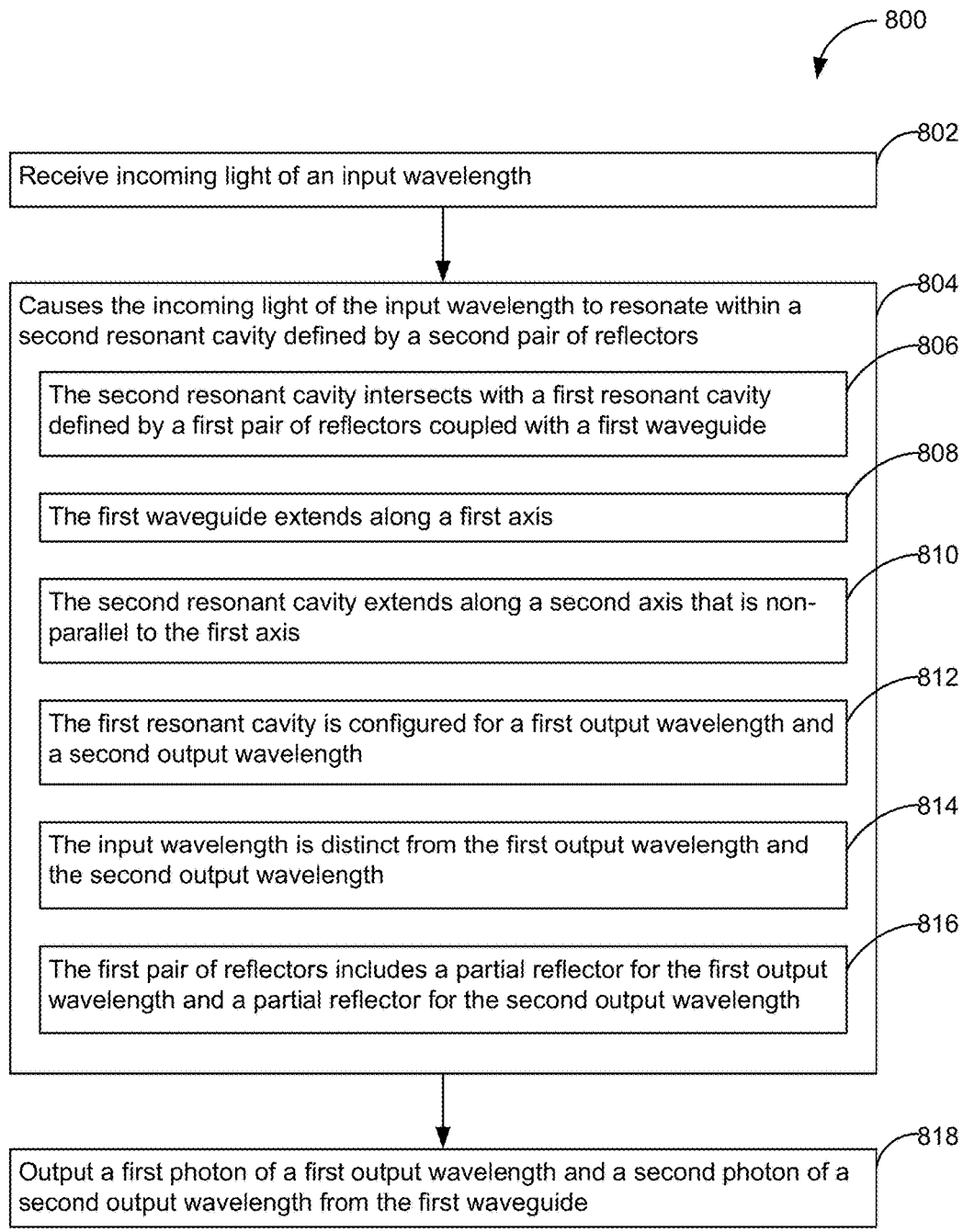
FIG. 8 is a flowchart illustrating a method for providing photons in accordance with some embodiments.

FIG. 8 is a flowchart illustrating method 800 for providing or generating photons in accordance with some embodiments. Method 800 is performed by a photon source device (e.g., any photon source device of FIGS. 1A-9E).

The photon source device receives (802) input light of an input wavelength $\lambda_{in}$, and causes (804) the input light of the input wavelength $\lambda_{in}$ to resonate within a second resonant cavity (e.g., second resonant cavity 120 in FIG. 1A or 2B) defined by a second pair of reflectors (e.g., reflectors 118 in FIG. 1A or 2A).

In some embodiments, the second resonant cavity intersects (806) with a first resonant cavity (e.g., first resonant cavity 110 in FIG. 1A or 2A) defined by a first pair of reflectors (e.g., reflectors 108 in FIG. 1A or 2A) coupled with a first waveguide (e.g., first waveguide 104 in FIG. 1A or 2A).

In some embodiments, the first waveguide extends (808) along a first axis.

In some embodiments, the second resonant cavity extends (810) along a second axis that is non-parallel to the first axis.

In some embodiments, the first resonant cavity is configured (812) for a first output wavelength $\lambda_{out1}$ and a second output wavelength $\lambda_{out2}$.

In some embodiments, the input wavelength $\lambda_{in}$ is (814) distinct from the first output wavelength $\lambda_{out1}$ and the second output wavelength $\lambda_{out2}$.

In some embodiments, the first pair of reflectors includes (816) a partial reflector for the first output wavelength and a partial reflector for the second output wavelength.

The photon source device further outputs (818) a first photon of the first output wavelength $\lambda_{out1}$ and a second photon of the second output wavelength $\lambda_{out2}$ from the first waveguide.

In some embodiments, both the first waveguide and a second waveguide (e.g., second waveguide 114 in FIG. 1A) are arranged on a substrate (e.g., substrate 102 in FIG. 1A). The second waveguide is coupled with the second pair of reflectors so that the second resonant cavity is defined within the second waveguide.

In some embodiments, a first reflector of the second pair of reflectors has a first reflectance for the input wavelength, and a second reflector of the second pair of reflectors has a second reflectance for the input wavelength $\lambda_{in}$.

In some embodiments, the second reflectance is greater than the first reflectance for the input wavelength, and the second waveguide is configured to receive input light of the input wavelength $\lambda_{in}$ through the first reflector. Further, in some embodiments, the second reflectance for the input wavelength $\lambda_{in}$ of the second reflector of the second pair of reflectors is greater than a predetermined reflectance threshold, such that the second reflector is configured to reflect a substantial portion of input light of the input wavelength. Alternatively, in some embodiments, the second waveguide (e.g., second waveguide 120 in FIG. 2B) is configured to receive input light of the input wavelength from a direction that is non-parallel to the substrate.

In some embodiments, the first waveguide (e.g., first waveguide 104 in FIG. 3A) is configured to output photons of the first output wavelength and photons of the second output wavelength through a first reflector of the first pair of reflectors. The first reflector of the first pair of reflectors is both the partial reflector for the first output wavelength and the partial reflector for the second output wavelength. In some embodiments, the first pair of reflectors includes a second reflector located opposite to the first reflector of the first pair of reflectors, and the second reflector of the first pair of reflectors has a reflectance for the first output wavelength that is greater than a predetermined reflectance threshold and a reflectance for the second output wavelength that is greater than the predetermined reflectance threshold, such that the second reflector is configured to reflect a substantial portion of the light of the first and second output wavelengths.

In some embodiments, the first waveguide is coupled to an optical splitter (e.g., optical splitter 302 in FIG. 3A, such as a fiber optic splitter) configured to spatially separate the photons of the first output wavelength $\lambda_{out1}$ and the photons of the second output wavelength $\lambda_{out2}$ outputted through the first reflector of the first pair of reflectors.

In some embodiments, the partial reflector, of the first pair of reflectors (e.g., reflectors 108 in FIG. 3B), for the first output wavelength $\lambda_{out1}$ is distinct and separate from the partial reflector, of the first pair of reflectors, for the second output wavelength $\lambda_{out2}$. In some embodiments, the first waveguide is configured to output a substantial portion of light of the first output wavelength through a first reflector of the first pair of reflectors and a substantial portion of light of the second output wavelength through a second reflector of the first pair of reflectors that is distinct and separate from the first reflector of the first pair of reflectors. In some embodiments, the first reflector of the first pair of reflectors is the partial reflector, of the first pair of reflectors, for the first output wavelength, and the second reflector of the first pair of reflectors located opposite to the first reflector of the first pair of reflectors is the partial reflector, of the first pair of reflectors, for the second output wavelength.

It is noted that in some embodiments, at least one reflector of the first pair of reflectors and the second pair of reflectors includes a distributed Bragg reflector. In some embodiments, the first and second axes (e.g., first axis 106 and second axis 108 in FIGS. 1A and 1B) define a common plane and intersect with each other. Optionally, the first and second axes intersect at an angle that is substantially equal to 90 degrees. In an example, as shown in FIG. 1A, the common plane is substantially parallel to a planar surface of the substrate, and input light of the input wavelength enters the second resonant cavity along a direction that is substantially parallel to the planar surface of the substrate. Further, in an example as shown in FIG. 1B, both the common plane and the second axis of the second resonant cavity are substantially perpendicular to a planar surface of the substrate, and input light of the input wavelength enters the first waveguide along a direction that is substantially perpendicular to the planar surface of the substrate.

In some embodiments, a third waveguide (e.g., third waveguide 124 in FIGS. 4A and 5A) is also arranged on the substrate, and extends along a third axis. The third waveguide is coupled with a third pair of reflectors defining a third resonant cavity in the third waveguide for a third output wavelength that is distinct from the input wavelength and a fourth output wavelength that is distinct from the input wavelength. The third pair of reflectors include a partial reflector for the third output wavelength and a partial reflector for the fourth output wavelength. The second resonant cavity intersects with the third resonant cavity. Optionally, the first, second, third and fourth output wavelengths are distinct from one another. Optionally, the first output wavelength corresponds to the third output wavelength and the second output wavelength corresponds to the fourth output wavelength.

Further, in some embodiments, the second resonant cavity intersects with both the third resonant cavity and the first resonant cavity at a first interaction region (e.g., interaction region 180 in FIG. 5A) of the second resonant cavity. Alternatively, in some embodiments as shown in FIG. 4A, the first resonant cavity intersects with the second resonant cavity at a first interaction region of the second resonant cavity, the second resonant cavity intersects with the second resonant cavity at a second interaction region of the second resonant cavity. The second interaction region of the second resonant cavity is distinct and separate from the first interaction region of the second resonant cavity. Both the first and second interaction regions of the second resonant cavity are located between the second pair of reflectors. Optionally, the third axis (e.g., third axis 120 in FIG. 4A) is substantially parallel to the second axis.

In some embodiments, the input wavelength includes a first input wavelength $\lambda_{in1}$. The photon source device further includes a fourth waveguide (e.g., fourth waveguide 134 in FIGS. 4B and 5B) arranged on the substrate. The fourth waveguide extends along a fourth axis. The first waveguide is coupled with a fourth pair of reflectors defining a fourth resonant cavity in the fourth waveguide for a second input wavelength $\lambda_{in2}$. Optionally, the second input wavelength is equal to or distinct from the first input wavelength. A first reflector of the fourth pair of reflectors is a partial reflector for the second input wavelength. A second reflector of the fourth pair of reflectors has a reflectance for the second input wavelength that is greater than a reflectance for the first reflector of the fourth pair of reflectors for the second input wavelength. The first resonant cavity intersects with the fourth resonant cavity. Further, in an example shown in FIG. 5B, the first resonant cavity intersects with both the second resonant cavity and the fourth resonant cavity at a first interaction region of the first resonant cavity. In another example shown in FIG. 4B, the first resonant cavity intersects with the second resonant cavity at a first interaction region of the first resonant cavity, and the fourth resonant cavity intersects with the first resonant cavity at a third interaction region of the first resonant cavity. The third interaction region is distinct and separate from the first interaction region of the first resonant cavity. Both the first and third interaction regions of the first waveguide are located between the first pair of reflectors. In some embodiments, referring to FIG. 4B, the fourth axis of the fourth waveguide is substantially parallel to the first axis of the first waveguide.

It is noted that in some embodiments, the first output wavelength is distinct from the second output wavelength. Optionally, both the first and second output wavelengths are longer than the input wavelength. Optionally, one of the first and second output wavelengths is shorter than the input wavelength (while the other of the first and second output wavelengths is longer than the input wavelength).

In some embodiments, a cladding layer (e.g., layer 122 in FIGS. 1B and 2B) configured to surround the first waveguide in conjunction with the substrate. In some embodiments, the first waveguide is made of silicon or silicon nitride. In some embodiments, the substrate includes a silicon-on-insulator substrate.

Although FIGS. 1A-9E show photon source devices with linear (e.g., straight) waveguides, in some embodiments, one or more linear waveguides are replaced with one or more nonlinear (e.g., curved) waveguides.

With respect to the examples of photon source devices provided in FIGS. 1A-9E, although interaction regions (e.g., 180-1, 180-2, 180-3 . . . 180-N) are shown to be circular, corresponding to input light with a circular intensity profile, the above-discussed interaction regions are not limited to only circular interaction regions and can correspond to input light with intensity profile(s) that are not circular (e.g., a beam having a shape of an oval, an ellipse, a square, a rectangle, a line, etc.).

It should be understood that the particular order in which the operations in FIG. 8 have been described is merely exemplary and is not intended to indicate that the described order is the only order in which the operations could be performed. One of ordinary skill in the art would recognize various ways to provide photons as described herein. Additionally, it should be noted that details of photon source devices described with respect to FIGS. 1A-7B are also applicable in an analogous manner to method 800. For brevity, these details are not repeated here.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

It will also be understood that, although the terms first, second, etc., are, in some instances, used herein to describe various elements, these elements should not be limited by these terms. These terms are only used to distinguish one element from another. For example, a first waveguide could be termed a second waveguide, and, similarly, a second waveguide could be termed a first waveguide, without departing from the scope of the various described embodiments. The first waveguide and the second waveguide are both waveguides, but they are not the same waveguide unless explicitly stated as such.

As used herein, the term "if" is, optionally, construed to mean "when" or "upon" or "in response to determining" or "in response to detecting" or "in accordance with a determination that," depending on the context.

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen in order to best explain the principles underlying the claims and their practical applications, to thereby enable others skilled in the art to best use the embodiments with various modifications as are suited to the particular uses contemplated.

What is claimed is:

1. A photon source device, comprising:
   a substrate;
   a first waveguide arranged on the substrate, the first waveguide extending along a first axis, the first waveguide coupled with a first pair of reflectors defining a first resonant cavity in the first waveguide, the first resonant cavity configured for a first output wavelength and a second output wavelength, the first pair of reflectors including a partial reflector for the first output wavelength and a partial reflector for the second output wavelength; and
   a second pair of reflectors defining a second resonant cavity extending along a second axis that is non-parallel to the first axis, the second resonant cavity intersecting with the first resonant cavity, the second resonant cavity configured for an input wavelength that is distinct from the first output wavelength and the second output wavelength, a first reflector of the second pair of reflectors having a first reflectance for the input wavelength and a second reflector of the second pair of reflectors having a second reflectance for the input wavelength.

2. The photon source device of claim 1, including:
   a second waveguide arranged on the substrate, the second waveguide coupled with the second pair of reflectors so that the second resonant cavity is defined within the second waveguide, wherein:
      the second reflectance is greater than the first reflectance for the input wavelength; and
      the second waveguide is configured to receive input light of the input wavelength through the first reflector.

3. The photon source device of claim 1, wherein the second reflectance for the input wavelength of the second reflector of the second pair of reflectors is greater than a predetermined reflectance threshold, such that the second reflector is configured to reflect a substantial portion of input light of the input wavelength.

4. The photon source device of claim 3, wherein:
   the second waveguide is configured to receive input light of the input wavelength from a direction that is non-parallel to the substrate.

5. The photon source device of claim 1, wherein the first waveguide is configured to output photons of the first output wavelength and photons of the second output wavelength through a first reflector of the first pair of reflectors.

6. The photon source device of claim 1, wherein the first reflector of the first pair of reflectors is both the partial reflector for the first output wavelength and the partial reflector for the second output wavelength.

7. The photon source device of claim 1, wherein the first pair of reflectors includes a second reflector located opposite to the first reflector of the first pair of reflectors, and the second reflector of the first pair of reflectors has a reflectance for the first output wavelength that is greater than a predetermined reflectance threshold and a reflectance for the second output wavelength that is greater than the predetermined reflectance threshold, such that the second reflector is configured to reflect a substantial portion of the photons of the first and second output wavelengths.

8. The photon source device of claim 1, wherein the first waveguide is coupled to an optical splitter configured to spatially separate the photons of the first output wavelength and the photons of the second output wavelength outputted through the first reflector of the first pair of reflectors.

9. The photon source device of claim 1, wherein the partial reflector, of the first pair of reflectors, for the first output wavelength is distinct and separate from the partial reflector, of the first pair of reflectors, for the second output wavelength.

10. The photon source device of claim 1, wherein the first waveguide is configured to output a substantial portion of photons of the first output wavelength through a first reflector of the first pair of reflectors and a substantial portion of photons of the second output wavelength through a second reflector of the first pair of reflectors that is distinct and separate from the first reflector of the first pair of reflectors.

11. The photon source device of claim 1, wherein at least one reflector of the first pair of reflectors and the second pair of reflectors includes a distributed Bragg reflector.

12. The photon source device of claim 1, wherein the first and second axes define a common plane and intersect with each other.

13. The photon source device of claim 1, further comprising:
   a third waveguide arranged on the substrate, the third waveguide extending along a third axis, the third waveguide coupled with a third pair of reflectors defining a third resonant cavity in the third waveguide for a third output wavelength that is distinct from the input wavelength and a fourth output wavelength that is distinct from the input wavelength, the third pair of reflectors including a partial reflector for the third output wavelength and a partial reflector for the fourth output wavelength, wherein the second resonant cavity intersects with the third resonant cavity.

14. The photon source device of claim 1, wherein the input wavelength includes a first input wavelength, the photon source device further comprising:
   a fourth waveguide arranged on the substrate, the fourth waveguide extending along a fourth axis, the first waveguide coupled with a fourth pair of reflectors defining a fourth resonant cavity in the fourth waveguide for a second input wavelength, a first reflector of the fourth pair of reflectors being a partial reflector for the second input wavelength, a second reflector of the fourth pair of reflectors having a reflectance for the second input wavelength that is greater than a reflectance of the first reflector of the fourth pair of reflectors for the second input wavelength, wherein the first resonant cavity intersects with the fourth resonant cavity.

15. A method of providing photons using the photon source device of claim 1, the method comprising:
   receiving input light of the input wavelength;
   causing the input light of the input wavelength to resonate within the second resonant cavity defined by the second pair of reflectors; and
   outputting a first photon of the first output wavelength and a second photon of the second output wavelength from the first waveguide.

16. A method of providing photons, the method comprising:
   receiving input light of an input wavelength;
   causing the input light of the input wavelength to resonate within a second resonant cavity defined by a second pair of reflectors, wherein:
      the second resonant cavity intersects with a first resonant cavity defined by a first pair of reflectors coupled with a first waveguide;

the first waveguide extends along a first axis;
the second resonant cavity extends along a second axis that is non-parallel to the first axis;
the first resonant cavity is configured for a first output wavelength and a second output wavelength;
the input wavelength is distinct from the first output wavelength and the second output wavelength; and
the first pair of reflectors includes a partial reflector for the first output wavelength and a partial reflector for the second output wavelength; and
outputting a first photon of the first output wavelength and a second photon of the second output wavelength from the first waveguide.

\* \* \* \* \*